(12) United States Patent
Garner

(10) Patent No.: US 9,360,093 B2
(45) Date of Patent: *Jun. 7, 2016

(54) SIX-DEGREE-OF-FREEDOM CAM-CONTROLLED SUPPORT PLATFORM

(71) Applicant: Baylor University, Waco, TX (US)

(72) Inventor: Brian A. Garner, Waco, TX (US)

(73) Assignee: BAYLOR UNIVERSITY, Waco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,831

(22) Filed: Oct. 7, 2014

(65) Prior Publication Data

US 2015/0020620 A1    Jan. 22, 2015

Related U.S. Application Data

(63) Continuation-in-part of application No. 13/587,401, filed on Aug. 16, 2012, now Pat. No. 8,852,010.

(60) Provisional application No. 61/523,979, filed on Aug. 16, 2011.

(51) Int. Cl.
| | |
|---|---|
| *A63G 19/20* | (2006.01) |
| *A63B 69/04* | (2006.01) |
| *F16H 21/50* | (2006.01) |
| *F16H 25/08* | (2006.01) |
| *A63B 21/005* | (2006.01) |
| *A63B 21/00* | (2006.01) |

(52) U.S. Cl.
CPC ............ *F16H 21/50* (2013.01); *A63B 21/0058* (2013.01); *A63B 21/154* (2013.01); *A63B 69/04* (2013.01); *A63G 19/20* (2013.01); *F16H 25/08* (2013.01); *Y10T 74/18152* (2015.01)

(58) Field of Classification Search
CPC ...... A63B 22/00; A63B 26/00; A63B 26/003; A63B 69/00; A63B 69/04; A63G 13/00; A63G 13/08; A63G 19/20; A63G 31/00; A63G 31/16
USPC ................. 472/59–61, 95–97, 103–105, 130; 434/55, 247; 446/29; 482/51, 57, 133, 482/136, 142, 145
See application file for complete search history.

(56) References Cited

U.S. PATENT DOCUMENTS

| | | | |
|---|---|---|---|
| 2,922,649 | A | 1/1960 | Hawkins |
| 4,585,212 | A | 4/1986 | Yanker |
| 4,666,362 | A | 5/1987 | Landsberger et al. |
| 4,674,740 | A * | 6/1987 | Iams et al. ...................... 482/56 |
| 5,009,412 | A * | 4/1991 | Roodenburg et al. ........... 472/59 |
| 5,179,525 | A | 1/1993 | Griffis et al. |
| 5,263,382 | A | 11/1993 | Brooks et al. |

(Continued)

FOREIGN PATENT DOCUMENTS

| | | |
|---|---|---|
| DE | 2047818 | 3/1972 |
| WO | 9832501 | 7/1998 |

*Primary Examiner* — Kien Nguyen
(74) *Attorney, Agent, or Firm* — Jackson Walker LLP

(57) ABSTRACT

A platform is provided, which platform is adapted to engage a base through a multiplicity of pulley engaging cables. A first end of each cable is attached to a cam follower assembly located on the base and a second portion of the cable is attached to the platform. A motor driving the multiplicity of cams, cam followers, and cables will move the platform, the platform typically being suspended above the base on the cables or the cables and compression springs.

37 Claims, 38 Drawing Sheets

Spring And Cam (SNC) Configuration

(56) References Cited

U.S. PATENT DOCUMENTS

| | | |
|---|---|---|
| 5,313,854 A | 5/1994 | Akeel |
| 5,829,982 A | 11/1998 | Advani et al. |
| 5,848,939 A | 12/1998 | Smith |
| 6,162,058 A | 12/2000 | Yang |
| 6,543,740 B2 | 4/2003 | Gaunt et al. |
| 6,616,456 B1 | 9/2003 | Nalty et al. |
| 6,808,458 B1 | 10/2004 | Jung |
| 7,484,460 B2 | 2/2009 | Blum et al. |
| 8,105,219 B1 | 1/2012 | Sloan et al. |

* cited by examiner

Spring And Cam (SNC) Platform, Spring, and Base Close-Up

Spring And Cam (SNC) Cable, Pulley, and Follower Close-Up

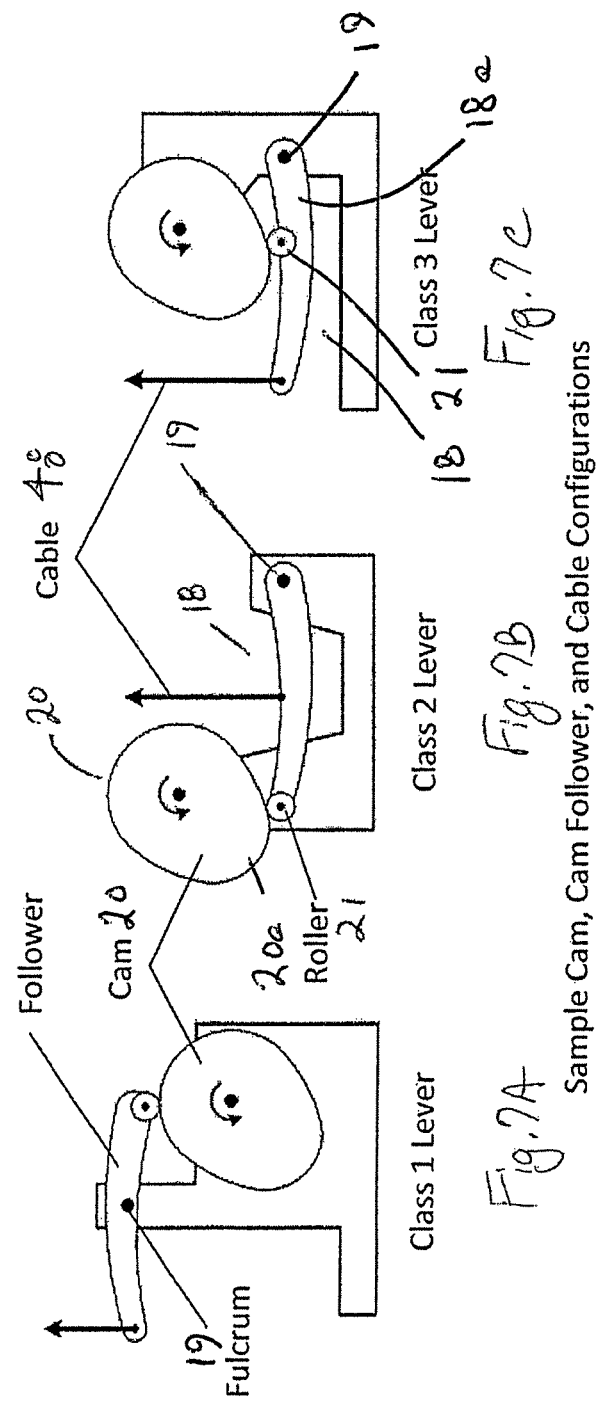

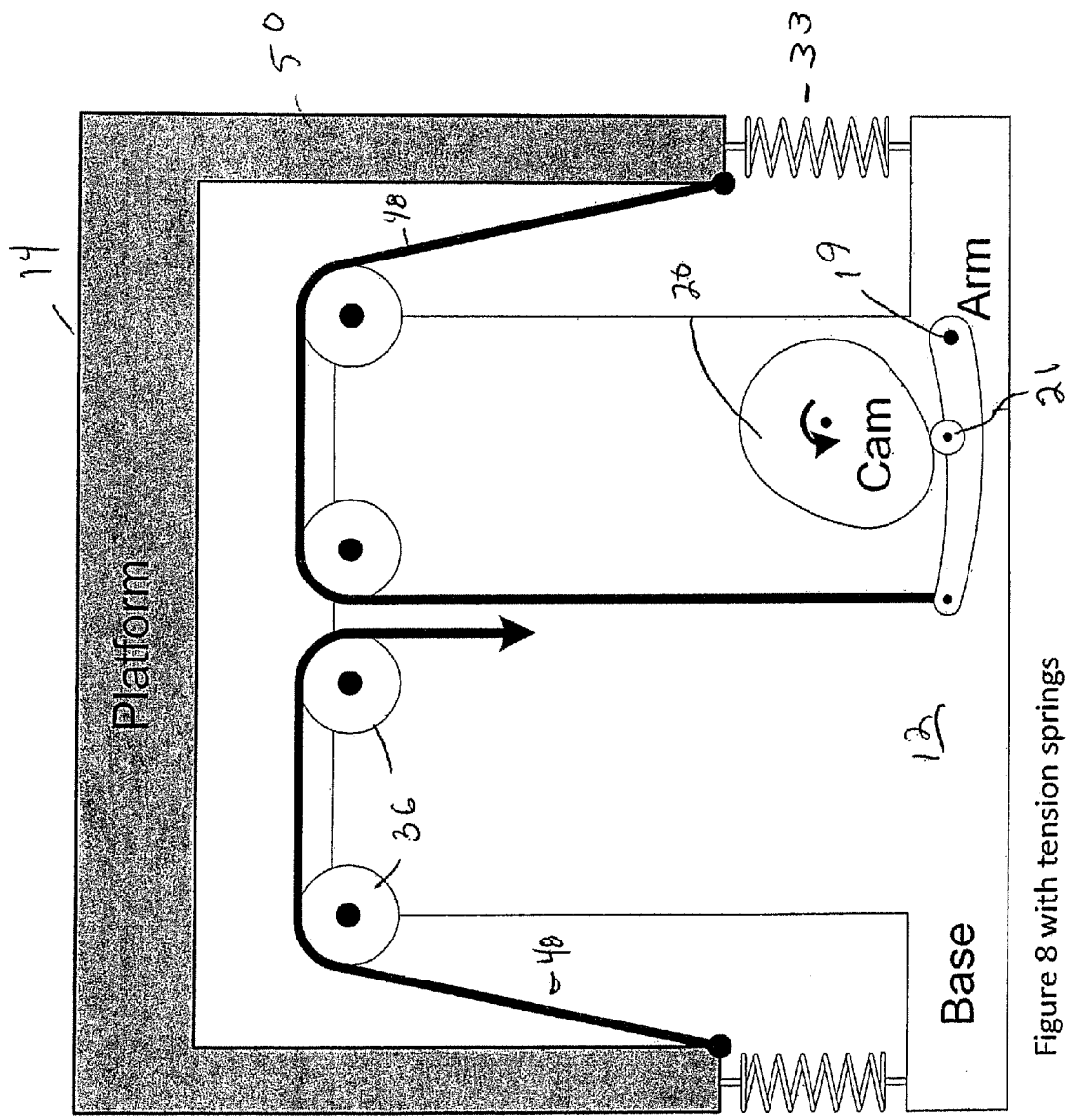
Figure 8 with tension springs

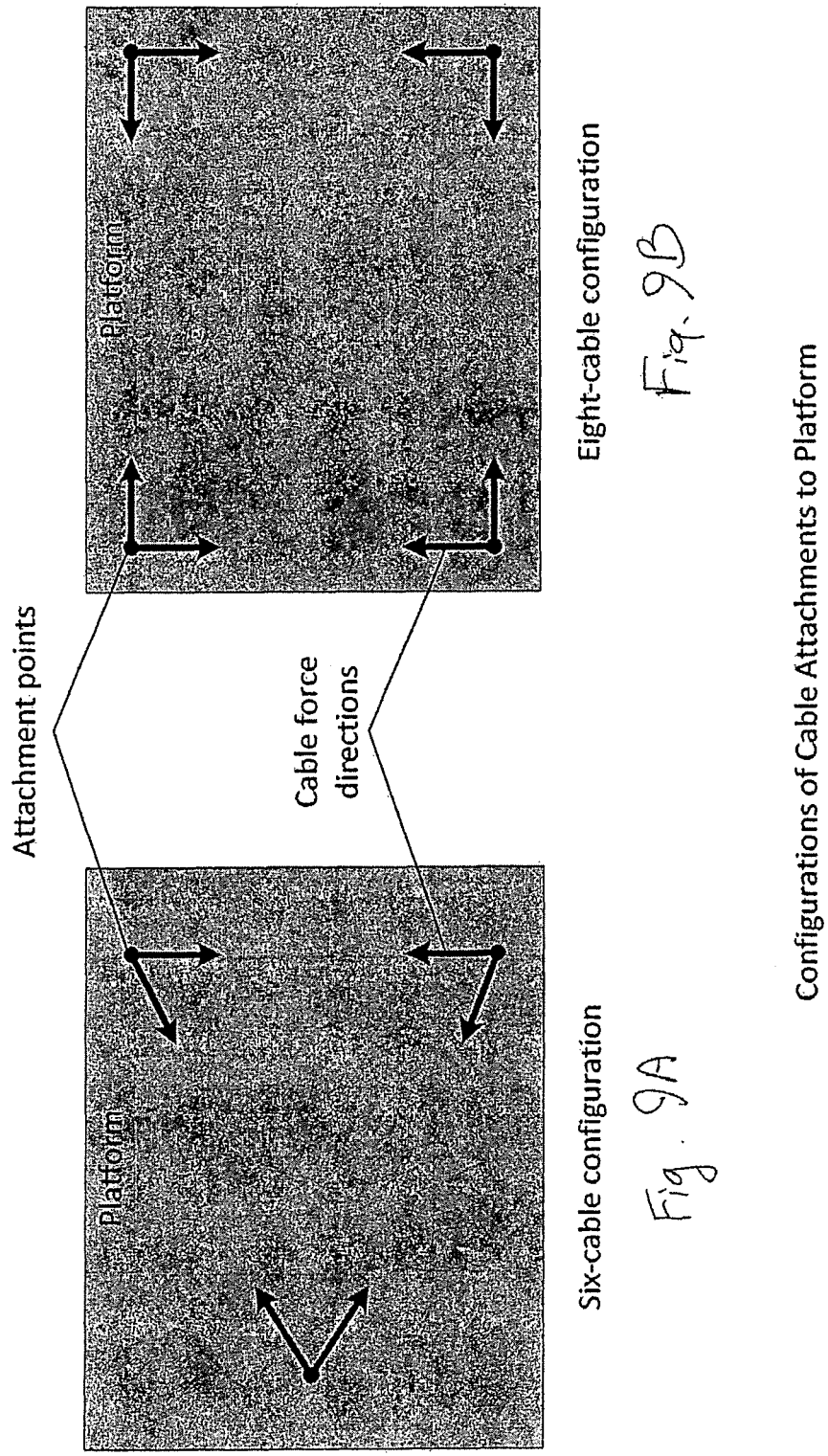

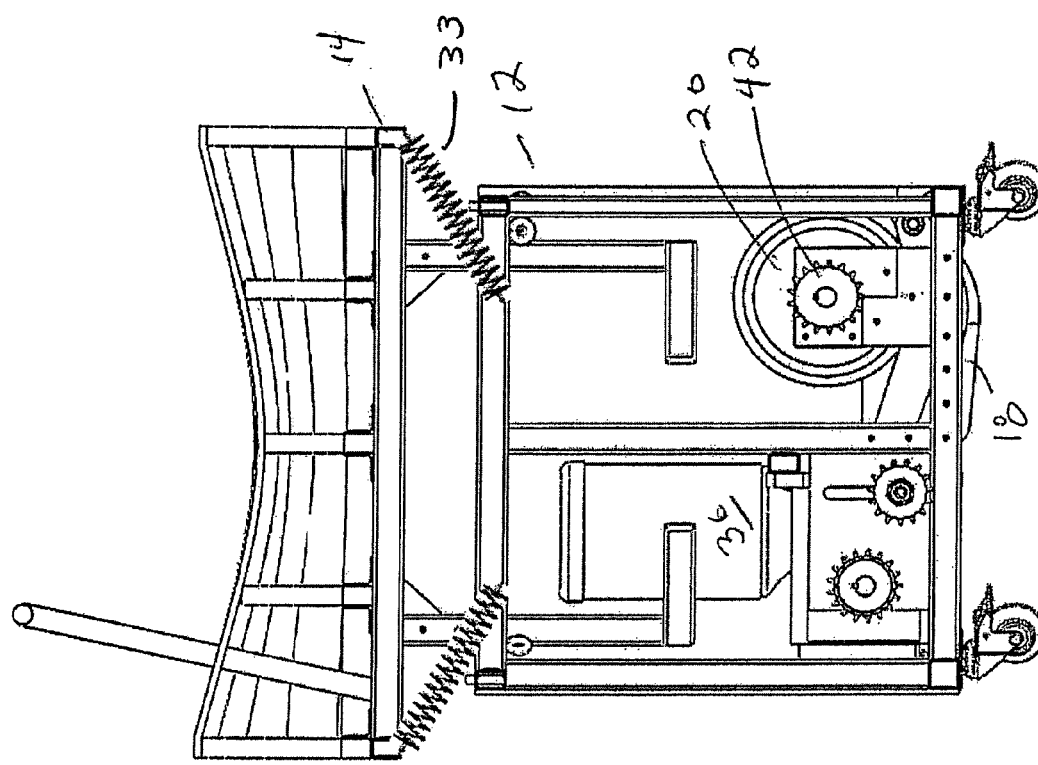
Figure 10A with tension springs.

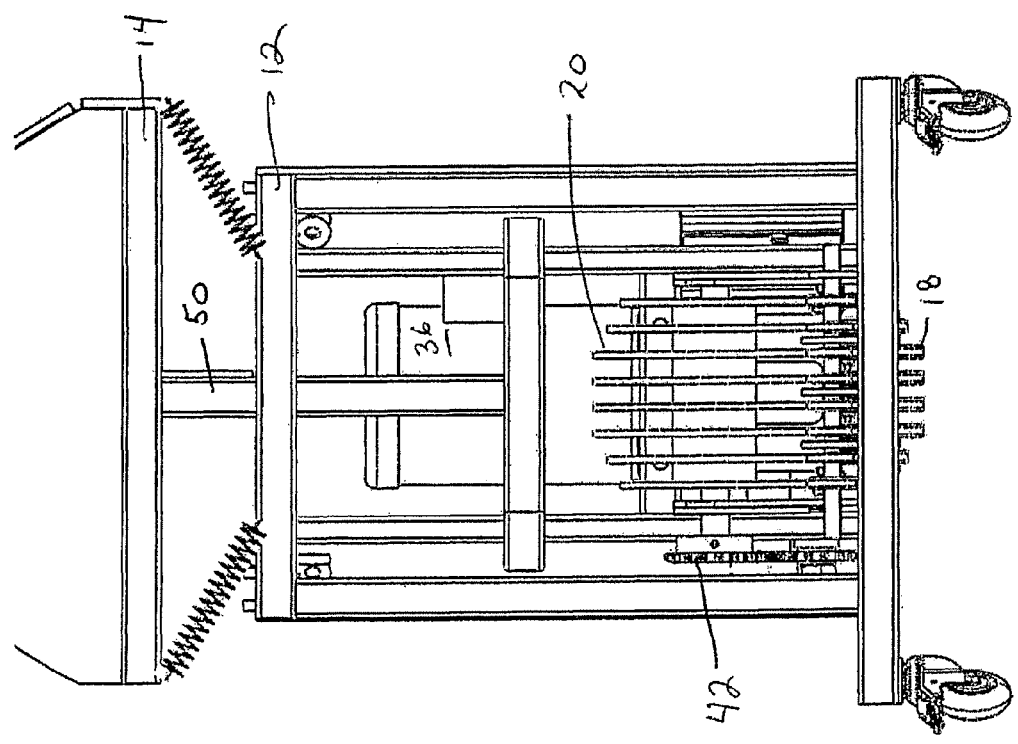
Figure 10B with tension springs

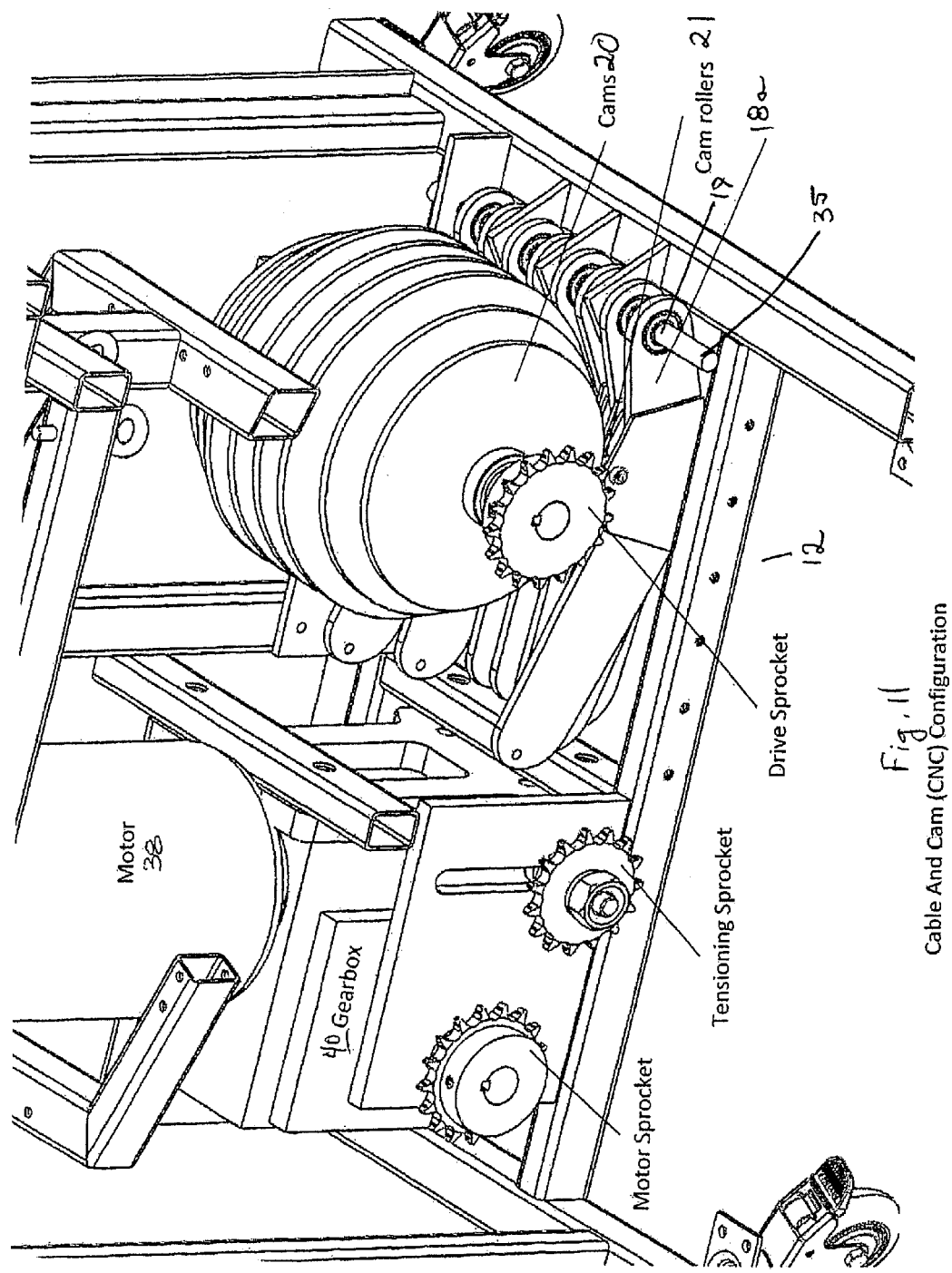

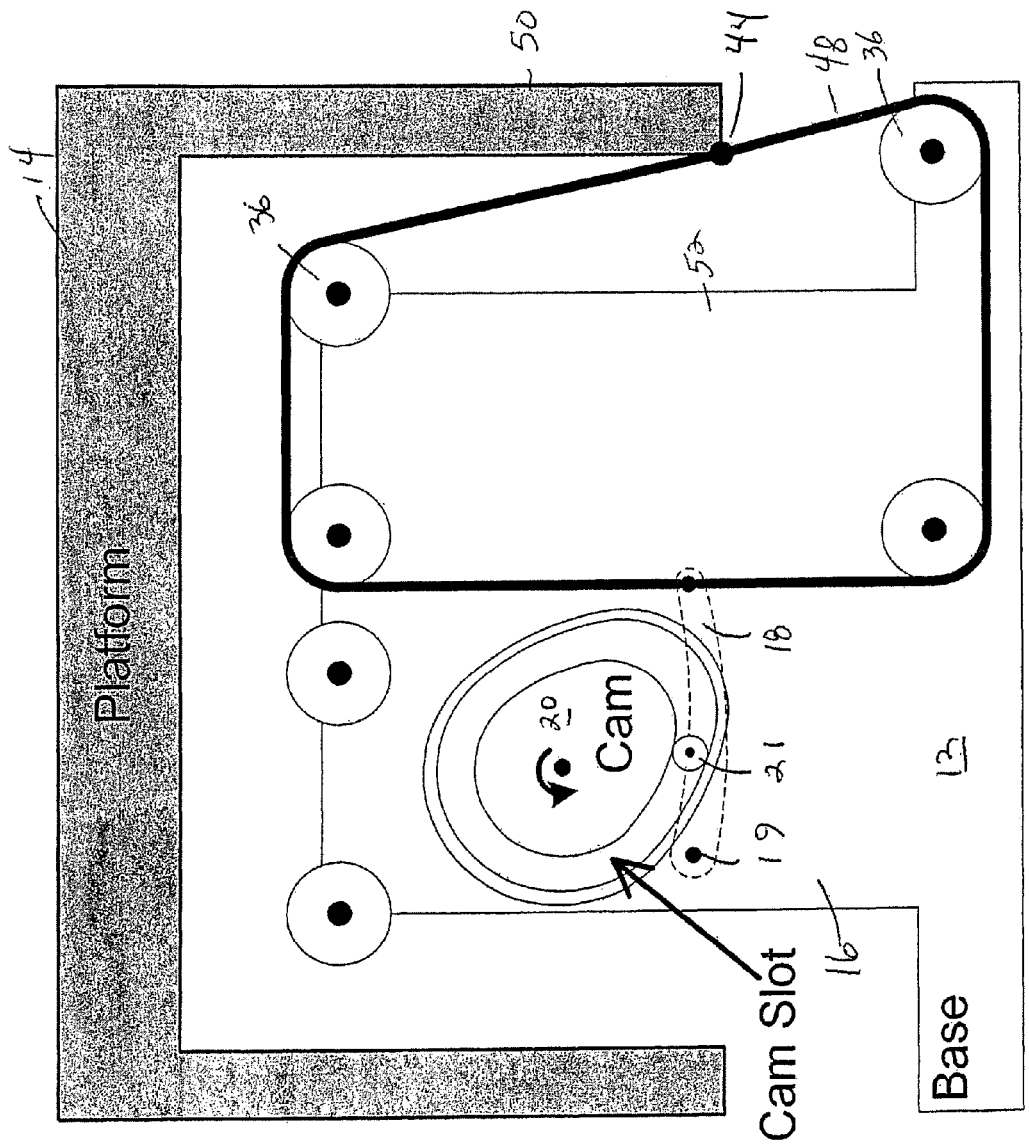
Figure 13A illustrating slotted cam for two-way-positive action

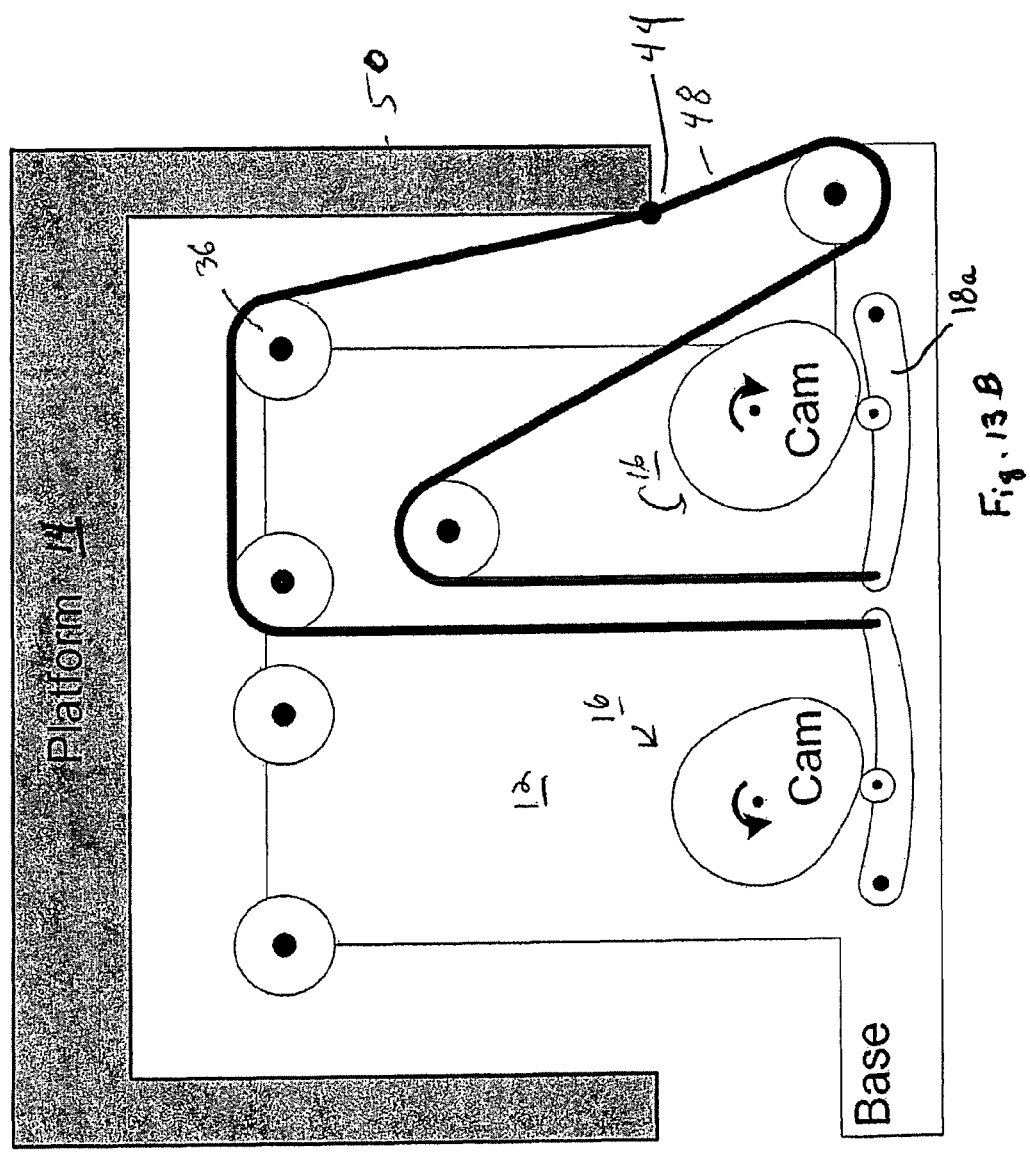

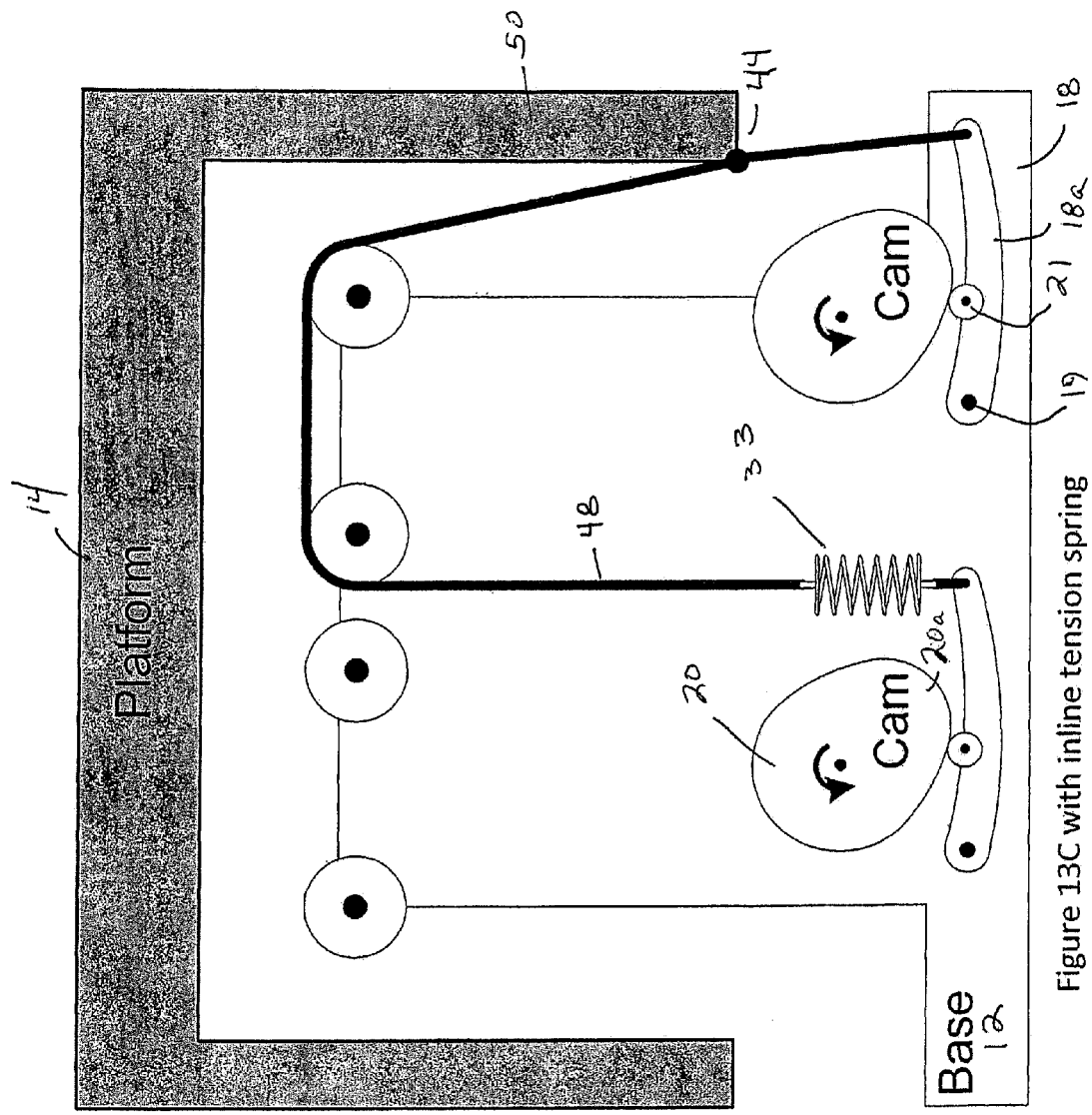

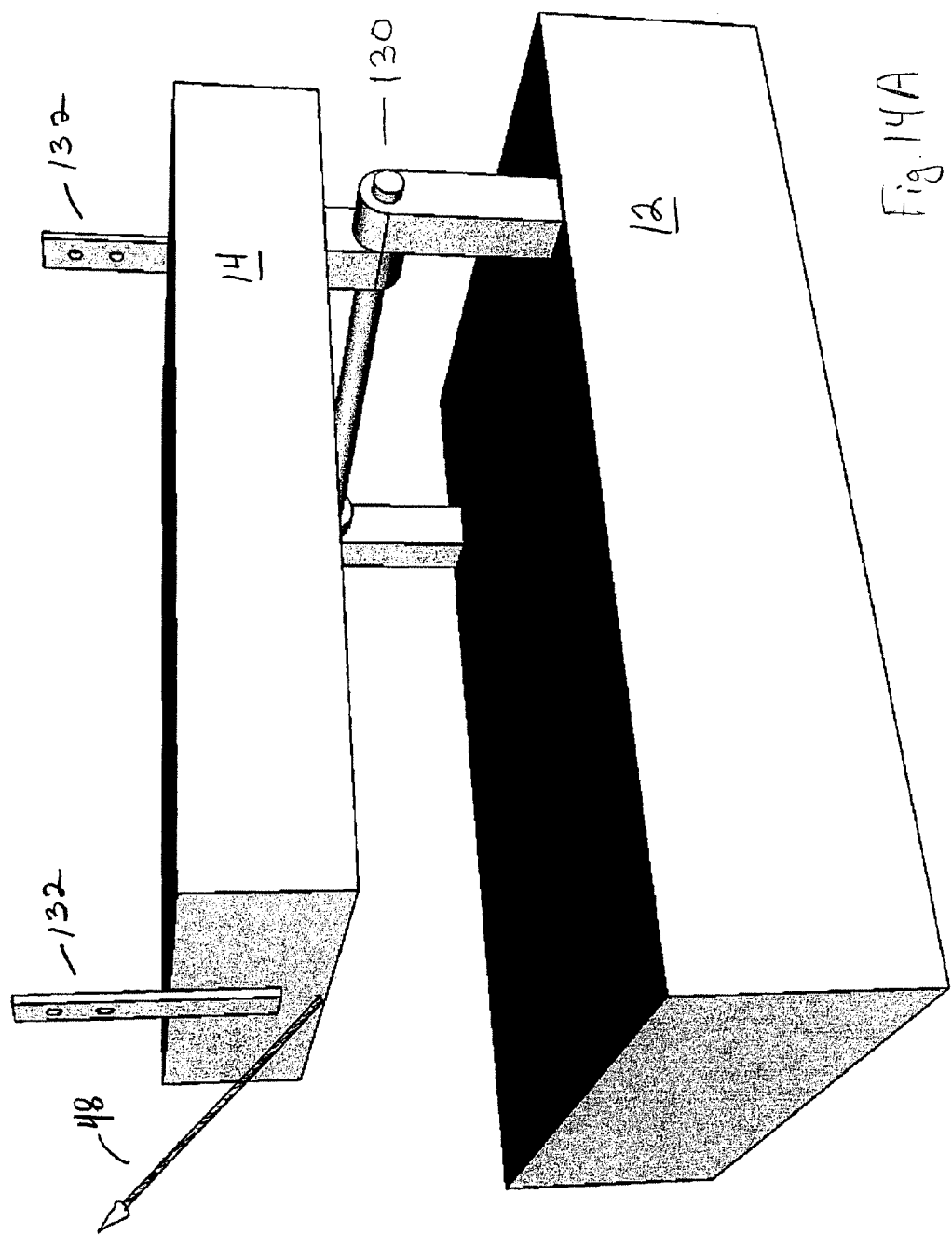

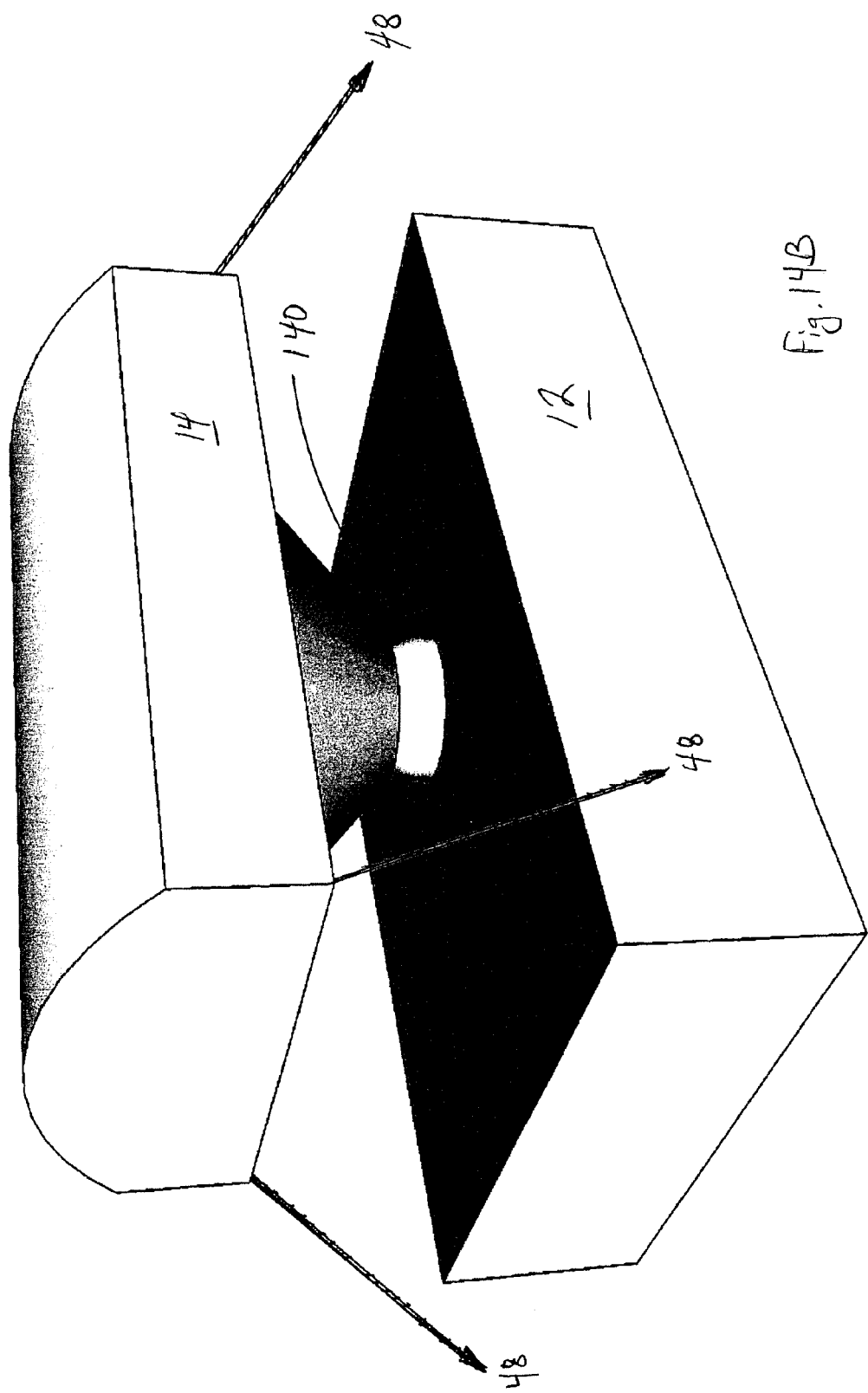

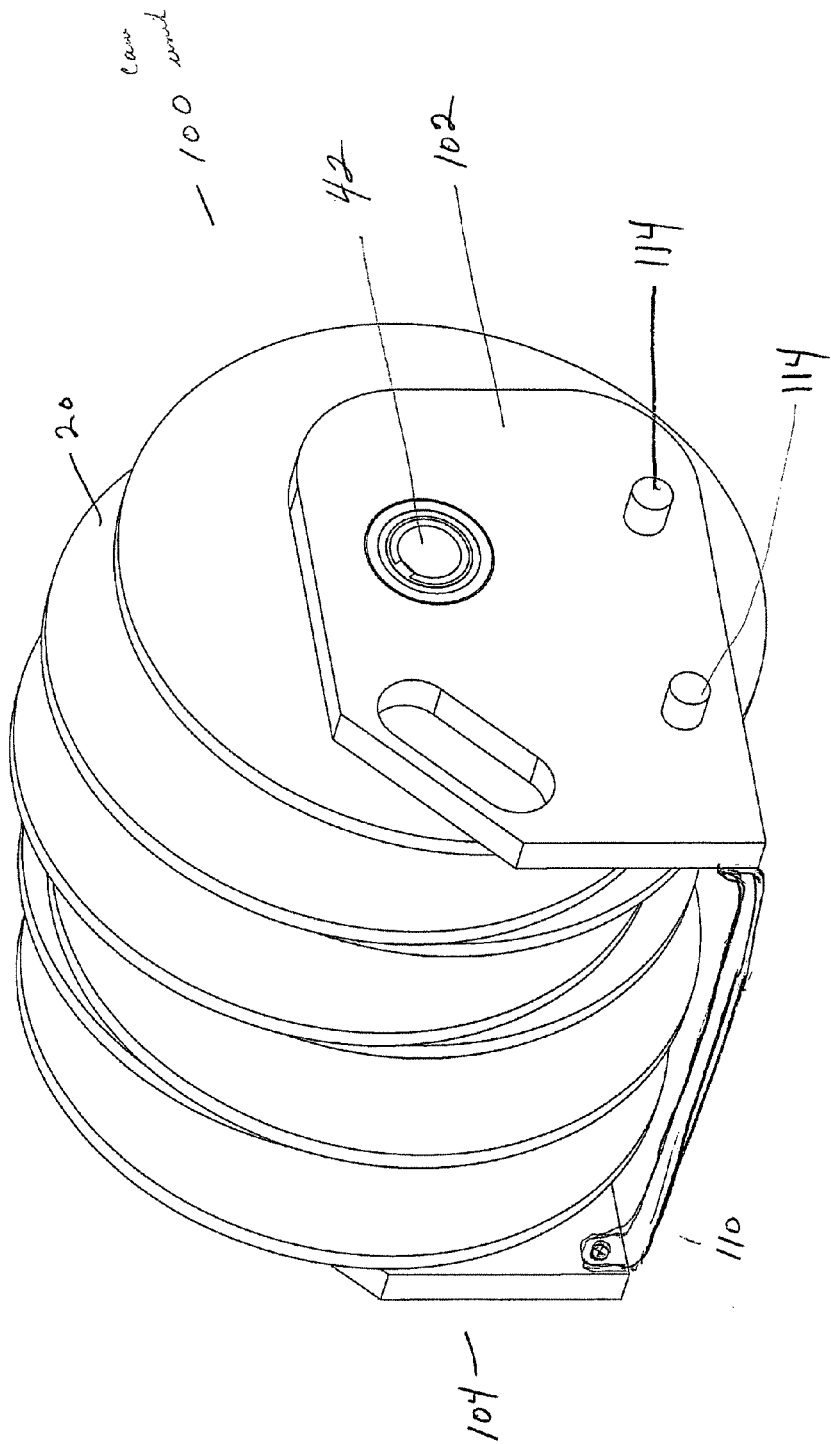

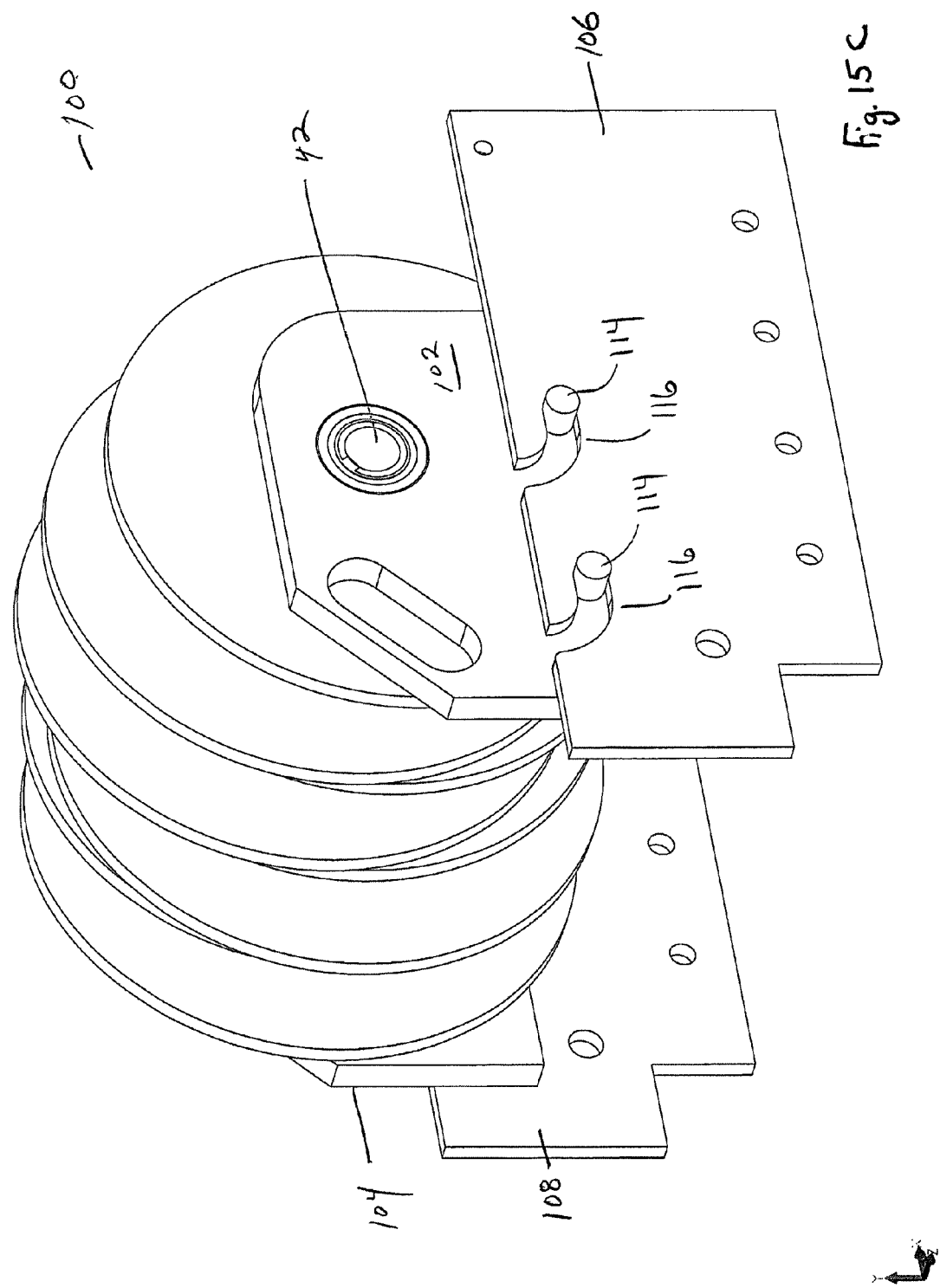

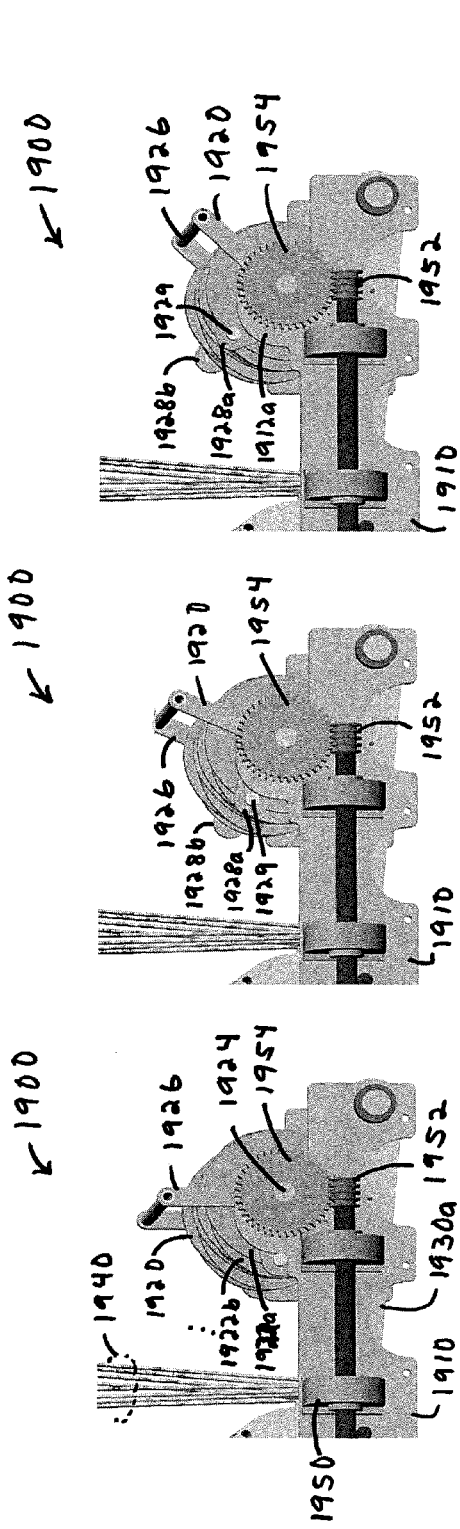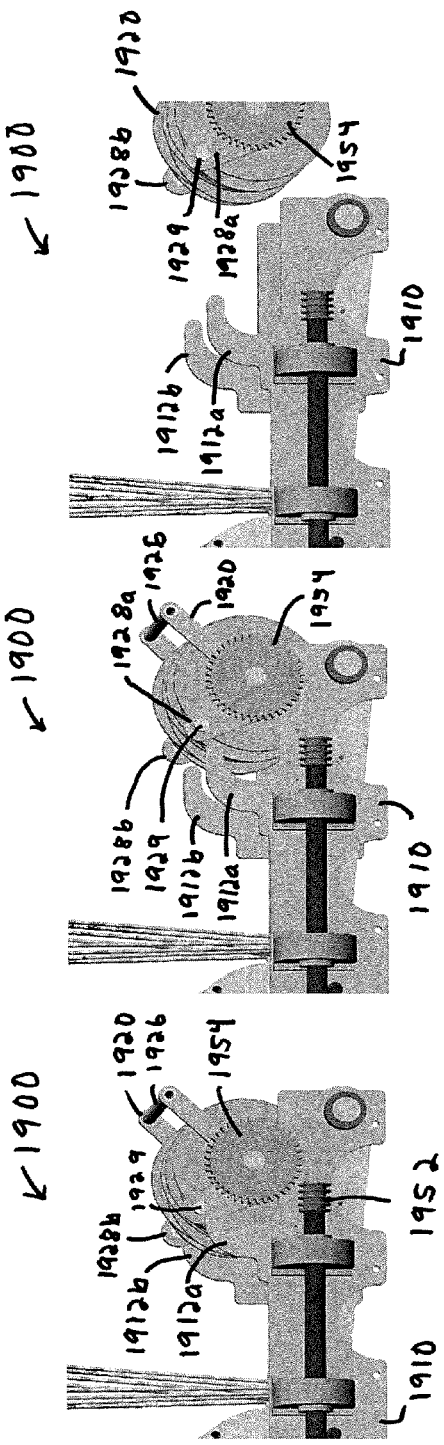
FIG. 19A FIG. 19B FIG. 19C
FIG. 19D FIG. 19E FIG. 19F

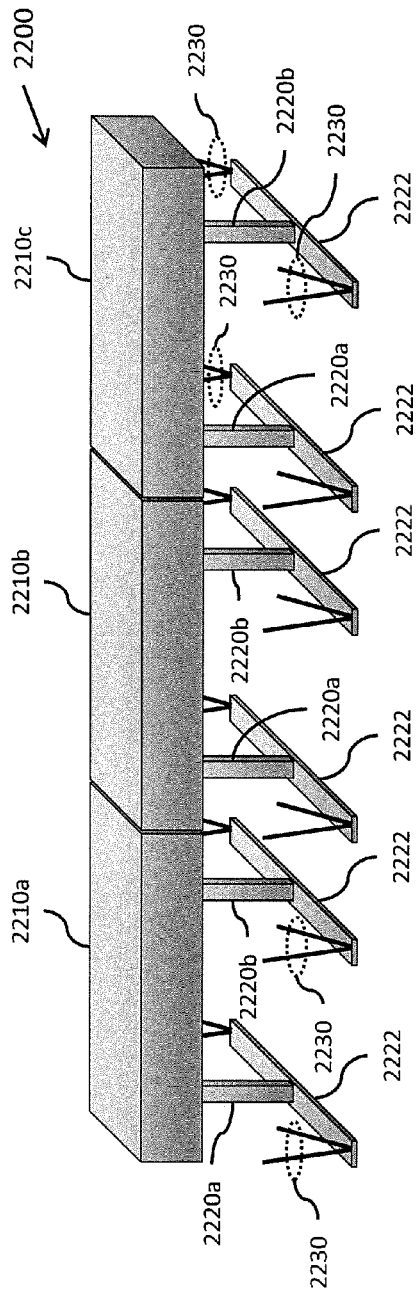
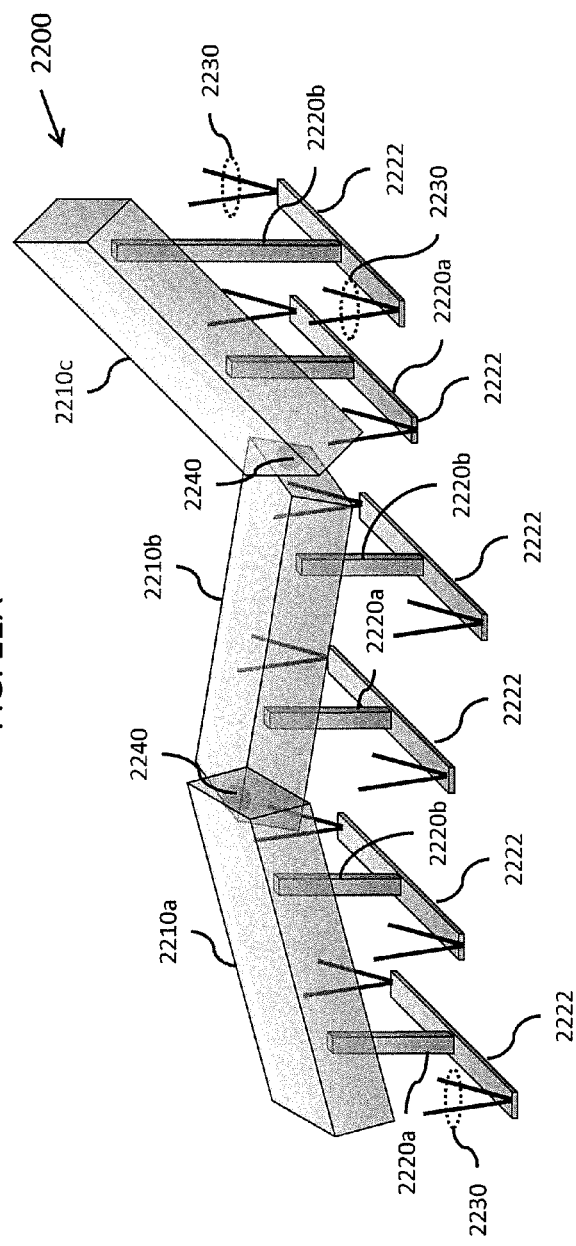
FIG. 22A
FIG. 22B

SIX-DEGREE-OF-FREEDOM CAM-CONTROLLED SUPPORT PLATFORM

RELATED APPLICATIONS

This application is a continuation in part of U.S. patent application Ser. No. 13/587,401, filed on Aug. 16, 2012, which claims priority to U.S. Patent Application No. 61/523,979, filed Aug. 16, 2011. Both of these prior applications are herein incorporated by reference in their entirety.

FIELD OF THE INVENTION

Platforms having up to six degrees of freedom, including platforms whose motion may be driven by a cam shaft having a multiplicity of cam lobes engaged therewith.

BACKGROUND OF THE INVENTION

Tables having six degrees of freedom are generally known in the art and uses include robotics, platforms for tools and instruments, flight simulators, hand controllers, cranes, and the like.

For example, U.S. Pat. No. 5,263,382 (Brooks, et al 1993) discloses a motion device providing six degrees of freedom. The motion device has three legs and is driven by a pair of motor assemblies. Each leg has a different drive. The device includes a base plate and a top plate with a plurality of legs.

SUMMARY OF THE INVENTION

The invention, in one embodiment, is an apparatus that uses a single-source rotational input (e.g., a motor) to drive general, complex, pre-programmed, periodic, three-dimensional motion of a platform with respect to a reference base (typically fixed to or resting on the ground). The device was created, in one embodiment, with a view towards simulating the experience of riding a horse for use in hippotherapy, for example. For such an application the moving platform can be outfitted as a seat or saddle surface, and the motion pattern programmed to realistically replicate the three-dimensional motion of a horse as experienced by the rider (FIG. 1). Beyond this type of application, the moving platform can be outfitted in any desired way, and the motion pattern programmed to any of a wide spectrum of possibilities, including, for example, that of human walking, or that needed to trace out a tool path.

The apparatus, in particular implementations, consists of a base structure, a motor and associated gearing, a set of cams and associated cam follower arms, a set of cables and associated pulleys, and a moving platform. In one embodiment, the Cable and Cam (CNC) configuration, the base structure is supported and driven primarily by the cables, as driven by the cams. In a second embodiment, the Spring and Cam (SNC) configuration, the base is supported primarily by springs, and is driven by cables and cams in opposition to the springs. The shape and position of the cams, cables, and pulleys determines the motion pattern of the platform, and so permits such motion to be programmed. The motor can be one with speed control to generate the motion pattern at various speeds.

BRIEF DESCRIPTION OF THE DRAWINGS

FIGS. 7A, 7B, and 7C illustrate elevational views of how the cam, cam follower, and cable attachment can be configured as a Class 1 (7A), Class 2 (7B), or Class 3 (7C) lever system.

FIG. 8 illustrates in orthogonal view the basic structure of the CNC configuration, highlighting the path of a single, representative cable as it spans from the platform to the cam follower. Optional tension springs may be included to help stabilize the platform.

FIGS. 9A, 9B, and 9C illustrate orthogonal views of various typical arrangements of cable attachments to the platform. FIG. 9C illustrates the cable configuration of FIG. 3.

FIG. 10A is a side orthogonal view of a preferred embodiment of the Cam and Cable (CNC) configuration, with optional tension springs for added stability. FIG. 10B is a back view of the same preferred embodiment of the Cam and Cable (CNC) configuration, with optional tension springs for added stability. Cables and pulleys are not shown.

FIG. 11 is a perspective view of a preferred embodiment of the CNC configuration, highlighting the arrangement of motor, gearbox, sprockets, and cam assembly, including cam shaft, cams, cam follower shaft, cam followers, and cam rollers. The chain connecting sprockets is not shown.

FIGS. 13A, 13B, and 13C illustrate three different configurations of two-way positive action for control of the movement of a platform configured for a CNC embodiment of Applicant's device.

FIGS. 14A, 14B, 14C, 14D, and 14E illustrate in perspective views, alternate embodiments of Applicant's device, each having had, non-cable mechanical linkage between the platform and base as well as at least one cable.

FIGS. 15A, 15B, 15C, 15D, 15E, 15F, 15G, and 15H are all views of a cam unit for use in the various embodiments of Applicant's device.

FIGS. 19A-F are perspective views illustrating an example cam-controlled support system in which a cam assembly may be unlocked and disengaged from the system.

FIGS. 22A-B are perspective views of an example platform that can be driven by a cam-controlled support system.

DETAILED DESCRIPTION OF THE PREFERRED EMBODIMENT

Figure 1:
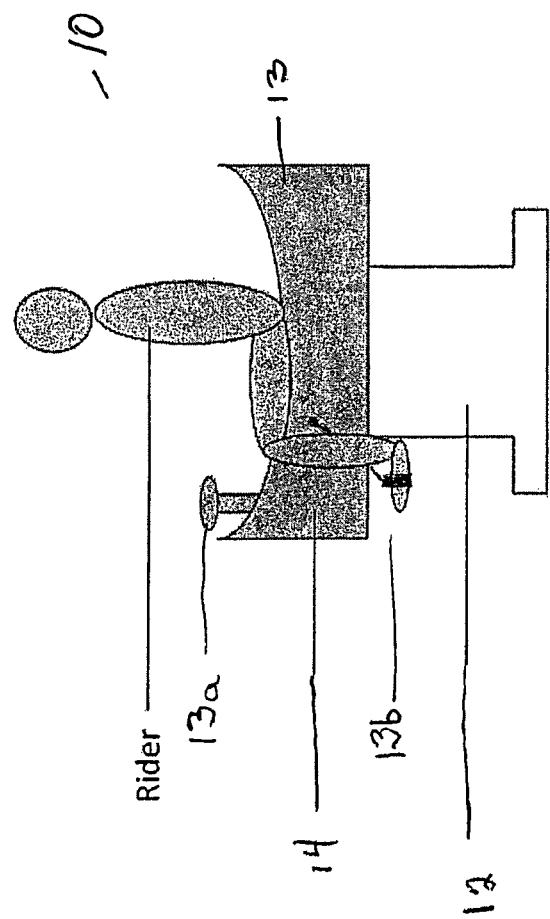
FIG. 1 illustrates a side orthogonal view of the basic components of the cam-controlled support platform as applied to simulation of the movement of a horse.

FIG. 1 illustrates some of the basic components of a device 10 for generating multi-dimensional motion, showing a cam-controlled support platform 14 as applied to simulation of the movement of a horse. Base frame or base 12 provides a stable, stationary foundation, typically resting on the ground or other support surface. Platform 14 moves relative to base 12, in one embodiment, in a three-dimensional, cyclic motion pattern. In simulating a horse, platform 14 can be configured with or as a saddle-like seat or saddle 13 upon which a human can sit and ride. A saddle horn 13a (adjustable in one embodiment) may be provided as well as adjustable stirrups 13c.

Figure 2:
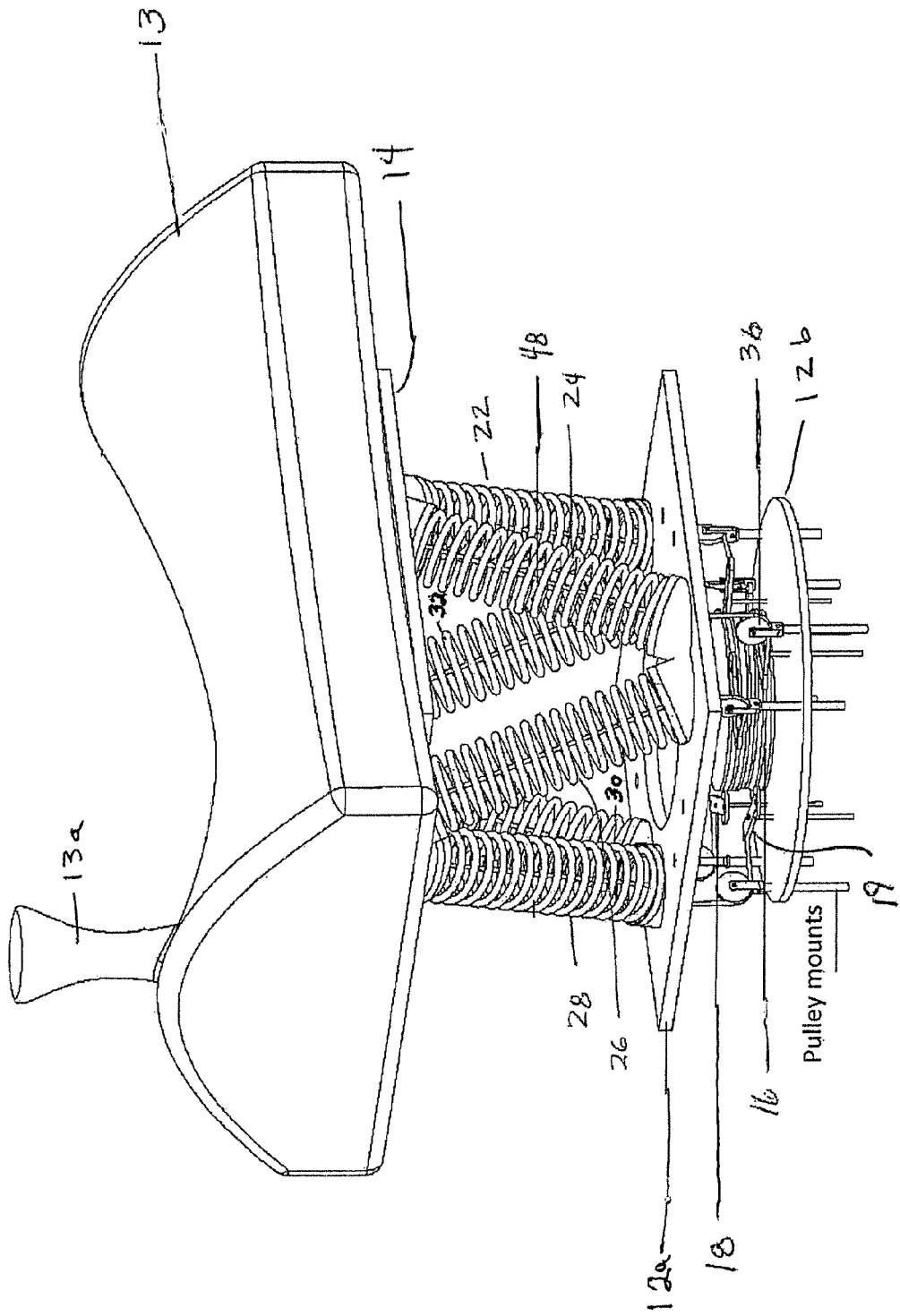
FIG. 2 is a perspective view of the spring and cam assembly (SNC) showing the platform (as a saddle), support springs, base structure, cables, cable pulleys, and cam assembly with cams and cam followers. The motor and power transmission system are not shown, and the base frame is shown in cutaway form.

FIG. 2 is a perspective view of a spring and cam assembly (SNC) showing the platform (with a saddle), support springs, base structure, cables, cable pulleys, and cam assembly with cams and cam followers. The motor and power transmission system are not shown, and the base frame is shown in cutaway form. Base 12 is seen to have, in one embodiment, an upper member 12a and a lower member 12b.

Figure 3:
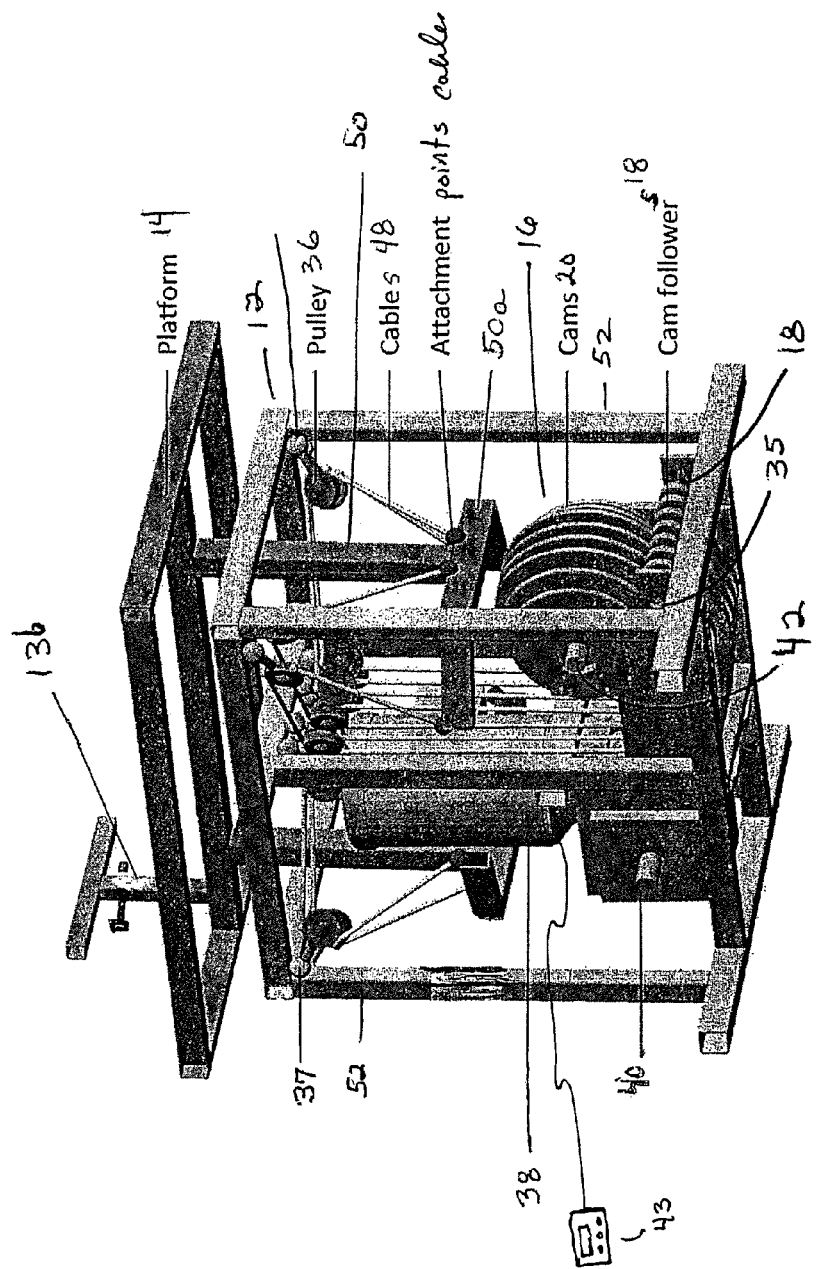
FIG. 3 is a perspective view of the cable and cam assembly (CNC) showing the platform (as a rectangular frame), base structure, cables, pulleys, motor, gearbox, and cam assembly with cams and cam followers. The sprockets and chain that connect the gearbox to cam shaft are not shown.

FIG. 3 is a perspective view of a cable and cam assembly (CNC) showing the platform (as a rectangular frame), base structure, cables, pulleys, motor, gearbox, and cam assembly with cams and cam followers. The sprockets and chain that connect the gearbox to cam shaft are not shown.

Figure 4:
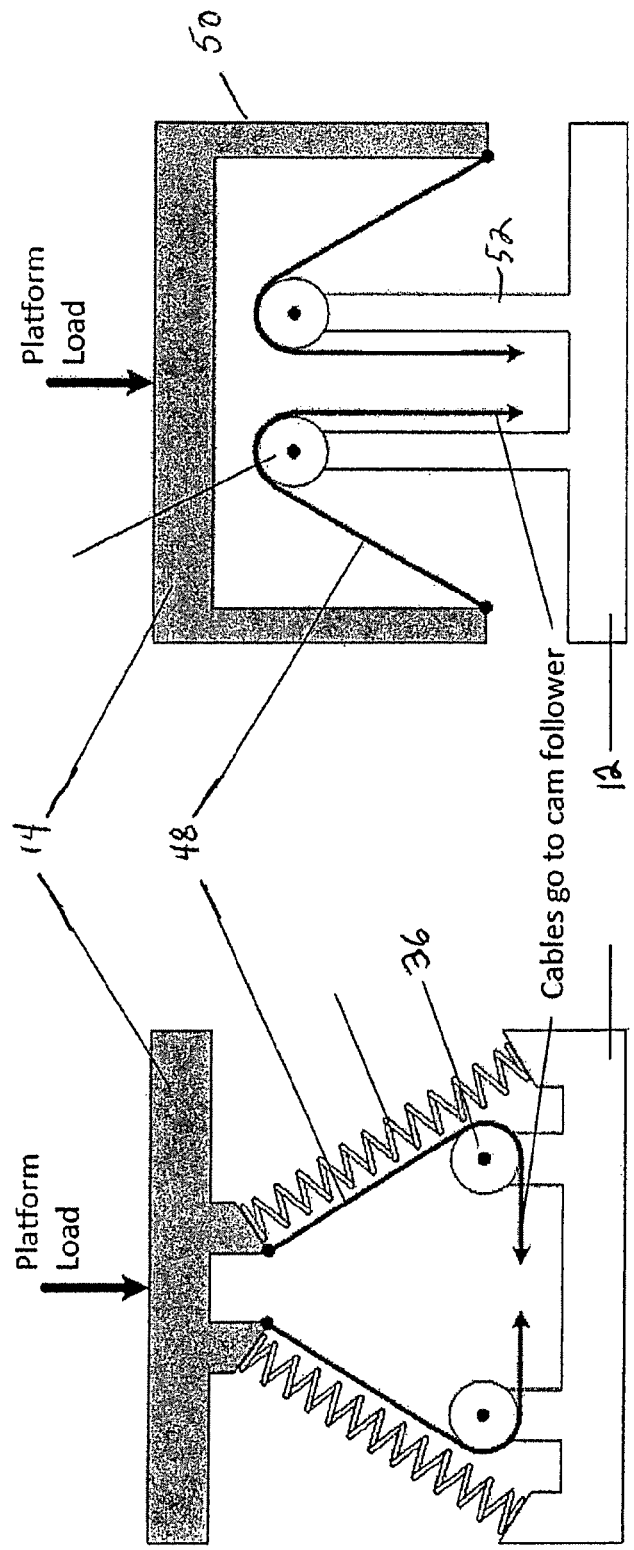
FIGS. 4A and 4B are orthogonal diagrams of the basic structure of the SNC (FIG. 4A) and CNC (FIG. 4B) configurations.

FIGS. 4A and 4B diagram the basic structure of the SNC (FIG. 4A) and CNC (FIG. 4B) configurations. In the SNC configuration the platform and load are supported by a set of compression springs, and cables pull the platform in opposition to the springs to drive motion of the platform. In the CNC configuration the platform and load are supported by the cables, which span in multiple directions to support and drive motion of the platform. In both configurations the paths of the cables are directed around pulleys and ultimately to the cam follower arms (not shown).

Figure 5:
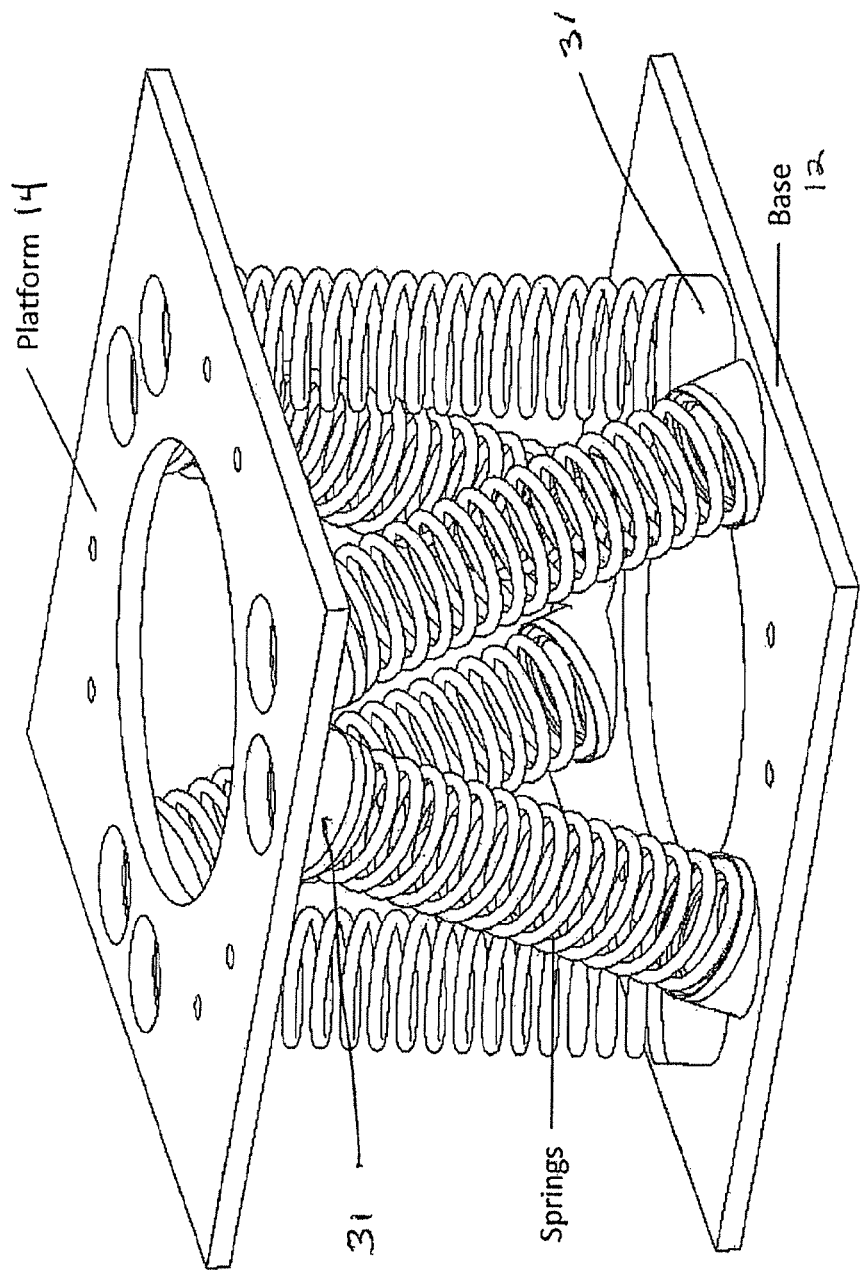
FIG. 5 is a perspective view of the spring support structure in the SNC configuration.

FIG. 5 is a perspective view of the spring support structure in the SNC configuration. Only the platform mounting plate, six springs, spring end caps, and base mounting plate are shown. The springs are arranged at various angles to provide force in multiple directions so as to drive the platform in three-dimensional, six degree-of-freedom movement patterns. The end caps illustrate a typical way the springs could be mounted to the platform and base plates.

Figure 6:
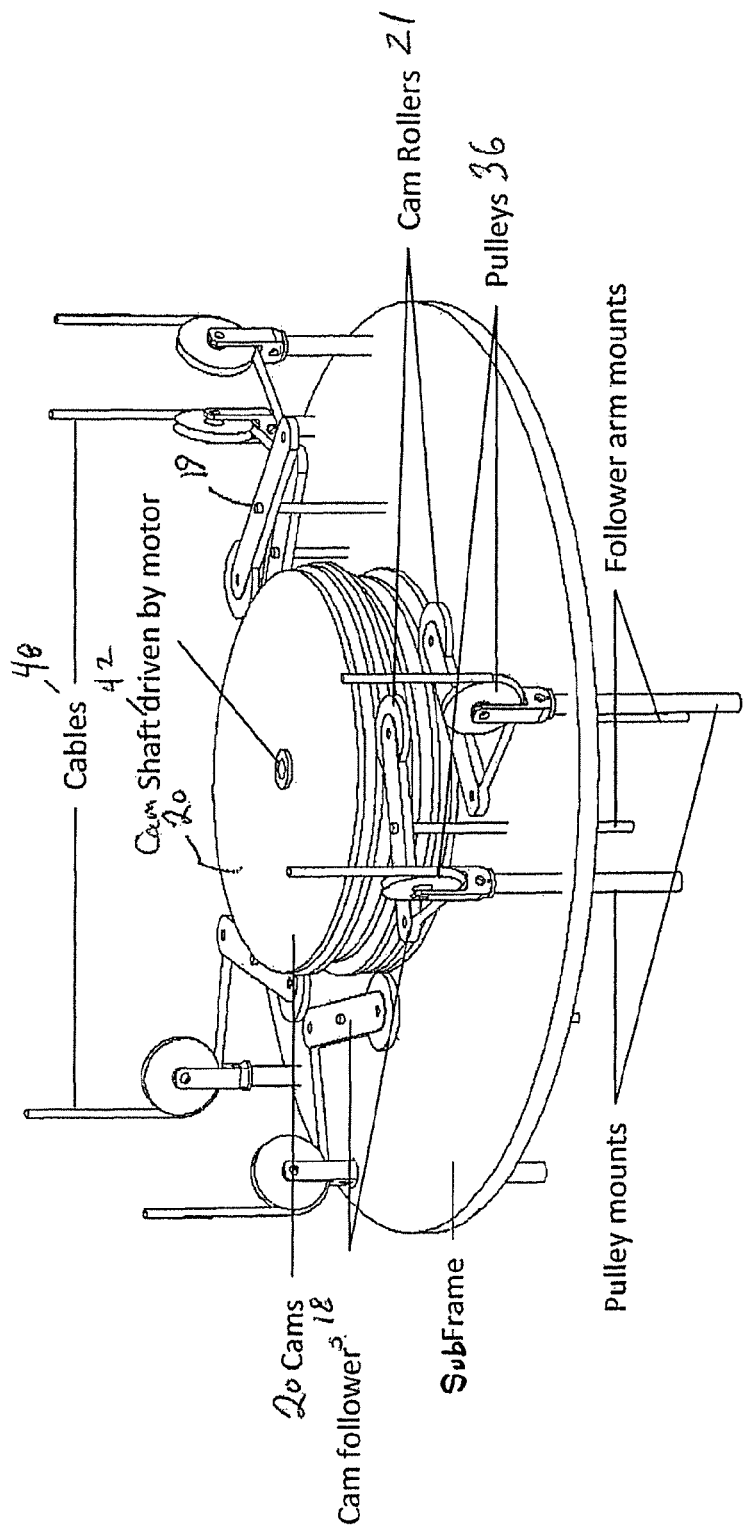
FIG. 6 is a perspective view of a typical embodiment of the SNC configuration, showing how the cables, pulleys, cam follower arms, and cams may be arranged.

FIG. 6 is a perspective view of a typical embodiment of the SNC configuration. The cam assembly is shown with six cams mounted to a common, vertical shaft that is driven by the motor and power transmission system (not shown). Cam followers are mounted on individual, vertical axes, and each engages a corresponding cam by way of a cam roller. Tension in cables attached to the removed end of the cam follower press the roller against the cam, and as the cam rotates, the cam shape induces rotation of the follower and thereby displacement of the cable. In this figure, the cam followers are shown as class 1 levers, with the pivot axis between the roller and cable attachment. The cable is routed around pulleys and ultimately to attach on the platform (not shown).

FIGS. 7A, 7B, and 7C illustrate how the cam, cam follower, and cable attachment can be configured as a Class 1 (7A), Class 2 (7B), or Class 3 (7C) lever system.

FIG. 8 illustrates the basic structure of the CNC configuration, highlighting the path of a single, representative cable 48 as it spans from platform 14 to the cam follower assembly 18. The platform structure includes extensions that project below pulleys mounted to the base structure. Cable 48 attaches to the lower end of the platform extensions, and then spans upwards around the pulleys, and then back down to attach to the cam follower pivoting member 18a. In this way the cable tension force pulls the platform upwards so as to support the platform load. The cable tension also pulls the cam follower roller 21 into the cam so that the undulating shape of the rotating cam produces displacement in the cable, and therefore of the platform. In this figure the cam follower is shown as a class 3 lever, with the cam follower roller 21 between the pivot axis and cable attachment. The use of pulleys 36 to direct the cable from platform attachment up, and then back down, is simply to permit the cam assembly to be removed below the platform for the sake of space limitations. If the platform were large enough, or the cam assembly small enough, then the cam assembly could be positioned up and inside a hollow of the platform, and would receive the cables either directly, or via a single pulley. It is shown this way because of space limitations, and so all cam followers could be in line on a single shaft, but in general it doesn't have to be.

FIGS. 9A and 9B diagram various typical arrangements of cable attachments to the platform. The set of cables must attach to the platform from different directions, with different lines of action, so as to be capable of driving the platform in any of the six-degree-of-freedom, three-dimensional motion. Theoretically, at least 6 different cables and cable directions are required for the six degrees of freedom. Typical embodiments may use six (FIG. 9A) or eight (FIG. 9B) cables, with the additional two of eight cables providing some redundancy and load sharing. However, any number of cables could be used in similar fashion, just so the lines of action are in various directions to produce the desired motion pattern. From the attachments on the platform, the cables will be routed (in the arrow directions) through pulleys to the cam follower (not shown).

FIG. 10A is a side view of the preferred embodiment of the Cam and Cable (CNC) configuration, with optional tension springs 33 for added stability. FIG. 10B is a back view of the preferred embodiment of the Cam and Cable (CNC) configuration, with optional tension springs for added stability. Cables and pulleys are not shown.

FIG. 11 is a perspective view of the preferred embodiment of the CNC configuration, highlighting the arrangement of motor, gearbox, sprockets, and cam assembly, including cam shaft, cams, cam follower shaft, cam followers, and cam rollers. The cam rollers are obscured in the Figure by the cams, but interface between the cam follower arms and the cam. A sprocket chain that winds around the three sprockets is not shown. The cables (not shown) attach at the hole in the free end of the cam follower arms. The cam follower arms pivot on a common shaft supported by brackets mounted to the base (one bracket is hidden in the Figure to reveal the follower arms).

Figure 12:
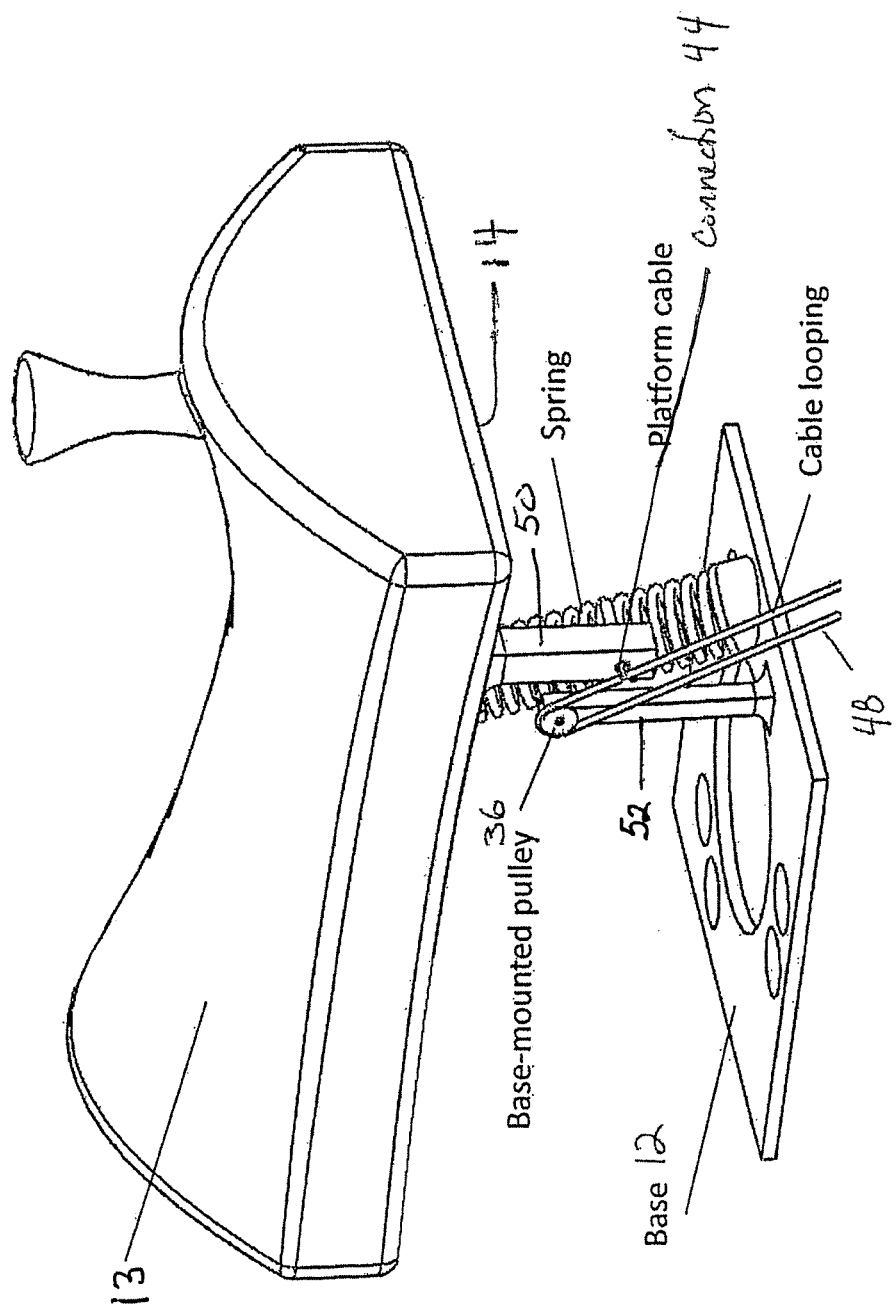
FIG. 12 is a perspective view of the platform (with a saddle), base mounting plate, and an exemplary, alternative configuration of a spring and cable embodiment, that may provide two-way positive cable force on the platform.

FIG. 12 is a perspective view of the platform (with a saddle), base mounting plate, and an exemplary, alternative configuration of spring and cable. In this configuration the spring is optional, and may be used to help support the platform load. The important feature of this configuration is that the cable loops back on itself so as to provide tension force to the platform attachment point in either direction. The advantage is that the looping cable can maintain tension in itself and does not need to rely on gravity, or spring force, to maintain tension. Another important feature in FIG. 12 is the two-way positive action illustrated by the ability of the cable to pull the platform in either direction.

FIGS. 13A-13C illustrate side elevational views of exemplary embodiments of two-way positive cable and cam (CNC) embodiments.

FIGS. 13A, 13B, and 13C illustrate three different configurations of two-way positive action for control of the movement of a platform configured for a CNC embodiment of Applicant's device.

In FIG. 13A, a single cam assembly 16 drives the platform reciprocally with cable 48 entrained on four base mounted pulleys, two of which are above and two of which are below the point of engagement between the extension 50 and base 12.

In FIG. 13A, it can be seen how the cable attaches to both the cam follower arm and platform in a loop to provide two-way positive action on the platform. The outline of the cam follower arm is shown in the Figure as a dotted line to reveal details of the roller and the cam. The cam is slotted in this variation so as to permit the cam follower arm to drive the cable with two-way positive action. That is, the cam shape is milled as a groove or slot on the side of the cam material with a groove width just larger than the roller, so that the roller can contact either the inner or outer surface of the groove. Contact with the inner surface of the groove will effect tension in the upper section of the cable and pull the platform connection point upwards. Contact with the outer surface of the groove will effect tension in the lower section of the cable and pull the platform connection point downwards. Typically, the weight of the platform and load will hold the cam follower arm and roller against the inner groove surface, but to prevent platform tipping, to create rapid downward acceleration, or to operate the platform in an environment where gravity is not always pulling the platform downward, the two-way positive action could be beneficial.

There are a number of variations of Applicant's device 10 illustrated. The first, the spring and cam (SNC) variation of FIG. 2, the platform and load are supported by multiple compression springs 22/24/26/28/30/32 in opposition to tension in the multiple cables 48. In the second, the cable and cam (CNC) variation (see FIG. 3, for example), the platform and load are primarily supported directly by tension in the cables 48, with optional support from the springs. In both variations, the platform support (by spring or cable) is arranged to apply forces to the platform at multiple points and in multiple directions so as to fully control up to all six degrees of freedom in up to three dimensions (translation forward/backward, upward/downward, leftward/rightward, and rotation about each of the three principal axes, namely, roll, pitch, and yaw).

In the first variation, the preferred embodiment has six compression springs arranged in prismatic or triangular pairs similar to the configuration of a Stewart Platform. In this variation, each spring pushes the platform in one direction, while the respective cables pull against the spring in the opposing direction. Cables passing through each spring are routed by pulley 36 or other change in direction means, to their respective cam follower arms that ride on the cams 20. While a single motor 38 is illustrated, multiple motions may also be provided with independent sets of cams, each having its own motor, with the motors programmed to run synchronous to one another for complex motion patterns. In another variation, the roles may be reversed, such that the motors and cams are on the moving platform. For additional stability and smoothness of motion, hydraulic, pneumatic or other suitable dampers (not shown) between the platform and the base may be used in conjunction with the springs.

Some embodiments of the devices set forth herein permit a single source rotational input (e.g., a motor) to drive general, complex, preprogrammed, periodic, three-dimensional motion of a platform with respect to a reference base. This motion is programmed in some embodiments by configuration of six or more drive or cam-linkage subsystems that each pull on cables 48 attached at various points of the platform 14. Each cam linkage subsystem or drive system typically consists of a cam 20, a cam follower assembly 18, a cable 48, and any pulleys 36 required to either direct the cable to the proper line to its platform attachment and/or support the cable under tension.

In the SNC configuration (FIGS. 2, 4A, and 5), a preferred embodiment has six compression springs 22/24/26/28/30 arranged in prismatic or triangular pairs similar to the configuration of a Stewart Platform. The springs push the respective attachment points in one direction, while the respective cables 48 pull against the spring in the opposite direction. The cables 48 may pass through or near each spring, or may be arranged differently than the springs, but the combined set of springs and set of cables typically oppose each other in all six degrees of freedom. The cables 48 are routed by pulleys 36 to their respective cam follower assemblies 18 that ride on the cams 20. End caps 31 are seen in FIG. 5 to provide support structure for mounting the springs to the platform and base plates.

In the first version, the spring and cam (SNC) controlled support platform includes rigid base 12 upon which platform 14 is supported with, typically, six springs 22/24/26/28/30/32 (typically prismatically arranged) attached directly or indirectly to a surface or member of the base and to an underside or member of the platform. In the SNC version, the springs are stiff enough to maintain tension on the drive cables 48, even under a loaded platform and at least some pulleys 36 are base mounted, typically on legs extending from the base (see FIGS. 4A and 12, for example). In these embodiments, pulleys 36 are under some compression, transmitted from the platform by cables 48.

In one embodiment (see FIG. 2), a drive mechanism including cables 48, a cam assembly 16, including a multiplicity of cams 20 each having cam lobes 20a, cam follower assemblies 18, and a motor 38 is provided. The cables 48, typically six, maintain the six springs under compression by attachment of the first end of the cables under spring load directly or indirectly to the underside of the suspended platform 14. The cables 48 are typically attached to the platform 14 at points central to (see FIG. 2), or near (see FIG. 4A), where the respective springs contact the platform. The cables are entrained on pulleys 36 to maintain a path nearly aligned with and typically running through the middle of, the axis of the respective spring. Removed ends or some section of the cables 48 of the drive assembly are attached to pivoting cam follower assemblies 18, which engage cams 20.

The cams 20 from all drive assemblies are typically stacked onto a common cam shaft 42 (which may be the driveshaft), typically gear driven by a gearbox 40 and powered by motor 38, which may be an electric motor. Electric motor may include a speed controller 43 (hard wired shown, wireless optional). The cam shaft 42 may be oriented in any direction, but is typically vertical or horizontal with respect to the platform 14. The cam follower assemblies 18 pivot on hinges 19, which hinge axes are typically also vertical or horizontal, to pull the respective cable and drive the point on the platform against the compressed spring or load. By the shape of the cam lobes 20a, and the configuration of the cables 48, springs 22-32, pulleys 36, and cam follower assemblies 18, the drive mechanism can move the platform 14 against the springs and through a controlled motion pattern, capable in some embodiments of three-dimensional, six degrees of freedom (e.g., x, y, z, translational direction, and roll, pitch, yaw).

Motor 38 drives cam shaft 42 and cam follower assemblies 18 with cam follower, such as rolling element 21, a pivoting member 18a engaging hinge 19 to simultaneously pull the cam shaft, cables, and platform against the compression of the springs 22-32 to move the platform in a controlled motion, capable of six degrees of freedom.

Cables 48 and, in some embodiments, springs are used to support the platform 14, which may comprise a saddle 13 having a saddle horn 13a or adjustable handle 13b for use in hippotherapy. Cables 48 driven by cam lobes 20a and cam follower assemblies 18 pull the platform 14 down against the springs and effect the desired motion pattern. Compression springs 22-32 press against the platform in opposition to the cables to create a return translation as tension/displacement in the cables is relaxed to generate the desired motion.

The cables 48 may be configured with one-way positive (non-looped) drive (see FIGS. 2, 4A, and 6) in which they engage and pull the underside of the platform 14 into compression of the springs, and the springs affect the return motion. In another embodiment (see FIGS. 12 and 13A-13C), the cables 48 may also be configured with two-way positive drive in which case the first end of the cable, after connection 44 to the platform 14, is looped around another base mounted pulley 36 and back to the base 12 so that both ends of the cable may be driven simultaneously in reciprocating motion. In this configuration, the platform may be positively driven both into compression of the spring or away from compression of the spring, so that the role of the spring becomes simply to assist offsetting external loads applied to the platform (e.g., the weight of a rider).

Typically six springs 22/24/26/28/30/32 are used between the base 12 and platform 14 to support motion in all six degrees of freedom. These are typically arranged in a Stewart Platform type of configuration which is common in robotics for a moving platform, but may take any other suitable configuration.

Figure 16:
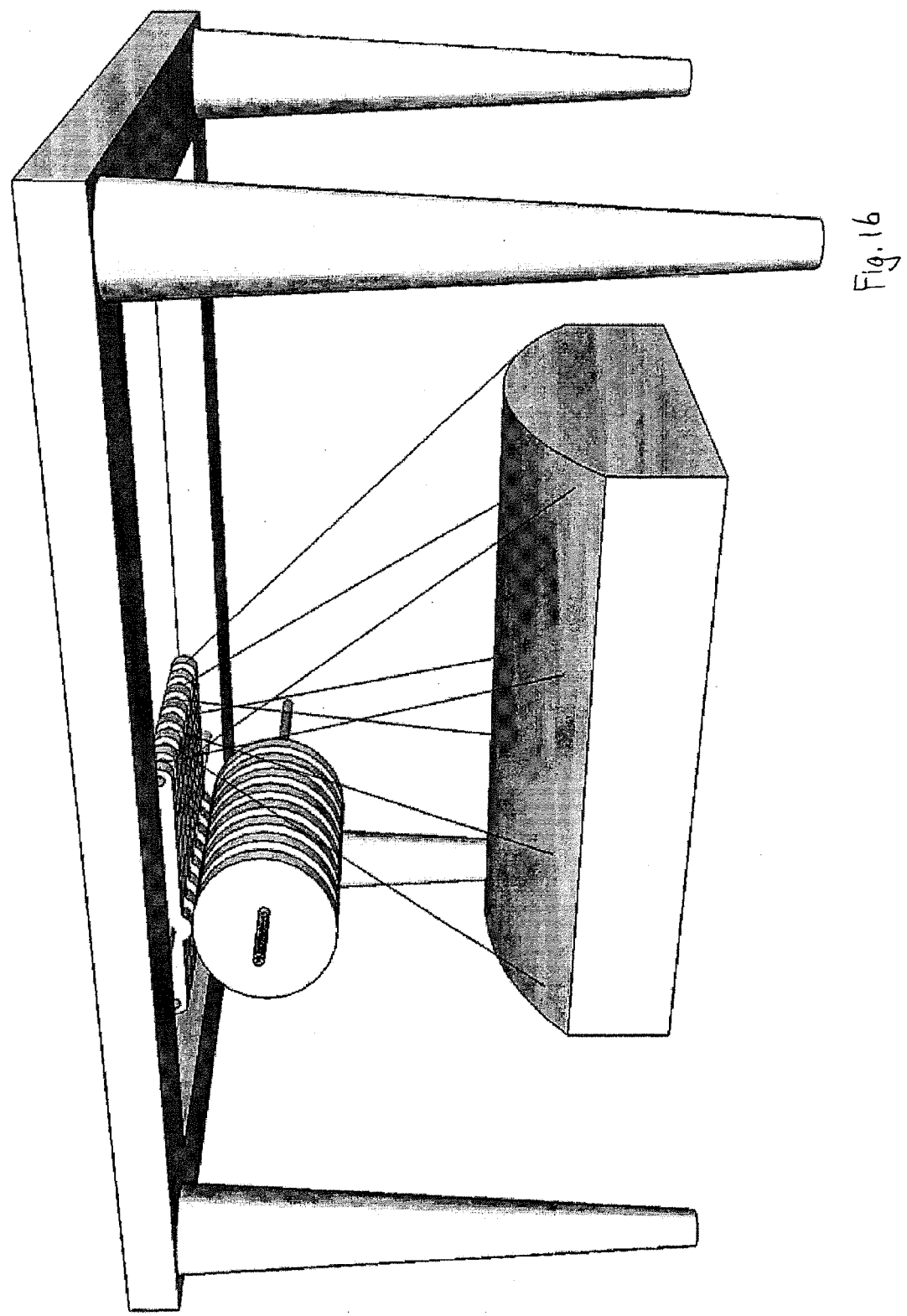
FIG. 16 is a perspective view of a "pulleyless" version of Applicant's device.

In a second embodiment, the cable and cam, or CNC configuration (FIGS. 3, 4B, 8, 13A-13C, 14A-14E, 16), the platform and load are typically supported directly by tension in the cables as routed by way of the base-mounted pulleys (except FIG. 16). The drive mechanism of the CNC, like the SNC (see FIG. 6), includes cables 48 (typically six or eight), a cam assembly 16 comprising multiple cams 20, cam follower assemblies 18, and motor 38. In both the SNC and CNC versions, the platform 14 is supported (either by spring or cable, respectively) at multiple points arranged in multiple directions so as to fully control motion in up to all six degrees of freedom in three dimensions (e.g., translations upward/downward, forward/backward, leftward/rightward, and rotations about each of these principal axes).

In the preferred embodiment of the CNC, the platform is suspended above the base structure by typically six (FIG. 9A) or eight (FIG. 9B) cables. One end or portion of the cables is mounted to various points on the platform, typically on platform extensions 50 that may project downward toward the base (see FIGS. 3, 4B, 8, 10A, 10B, 12, 13A-13C). From these points on the platform 14, the cables 48 typically project upwards to pulleys 36 supported at various points on the base that project upward toward the platform (see FIGS. 4B and 8, for example). In this fashion, the lower cable attachment points on the platform are supported by higher pulley mount points on the base so that the cables carried by the pulleys suspend the platform and its load against the force of gravity (platform and any platform load). Gravity (or other external load) maintains tension in the cables (shown in FIGS. 8, 10A, and 10B, for example), although tension springs 33 (see FIGS. 8, 10A, and 13C, for example) may also be added to assist in maintaining tension in the cables. The removed ends of the cables are routed by other pulleys to their connections with the respective cam followers and lobes. Looped cables, as in FIG. 13A, may be used or non-looped as in FIG. 13B. Looped or non-looped two-way positive embodiments are optional, the preferred embodiment is one-way positive.

Two additional variations for providing a two-way-positive platform drive capability are illustrated in FIGS. 13B and 13C using two separate cams on a single cable. In both cases, the reciprocating action is created by contact of a second cam follower pivoting member 18a and roller element 21 with the second cam, whose shape is designed to mirror the cable displacement action of the first cam. FIG. 13C also illustrates the optional use of a tension (inline with the cable in one embodiment, and stiff or soft) spring 33 to compensate for any error in the second cam shape and ensure sufficient tension in the looping cable 48. Tension cable engaging spring or springs may be used in the cables of any of the various configurations.

It is seen with reference to FIG. 8 that a two-way positive embodiment may be used to maintain tension even when the platform may become momentarily unloaded, for example, on a change of direction from upward to downward. In another embodiment, the cables may be configured to oppose one another, instead of relying on gravity or two-way positive engagement.

The CNC embodiments (FIGS. 3, 4B, 8, 14A-14E, for example) are typically configured with the platform 14 suspended above the base 12, and the platform having cable attachment points that project below corresponding pulley attachment points on the base. To achieve this arrangement the platform 14 typically includes rigid extensions or legs 50 that project down from the underside, and the base includes rigid extensions or legs 52 that may project up from the top (see FIG. 4B). The platform leg extensions 50 and the base leg extensions 52 are configured so as to pass alongside each other, but to not interfere with each other, as the platform moves through its programmed pattern.

To drive all six degrees of freedom of the platform in three-dimensional space, six cables (three platform leg extensions 50) are theoretically required as a minimum (see FIG. 9A). The use of eight cables (typically on four platform leg extensions) provides some level of redundancy, and may reduce the tension required in any single cable (FIG. 9B). In alternate embodiments, less than six degrees of freedom may be provided, in use of other cable/pulley arrangements.

Figure 9C:
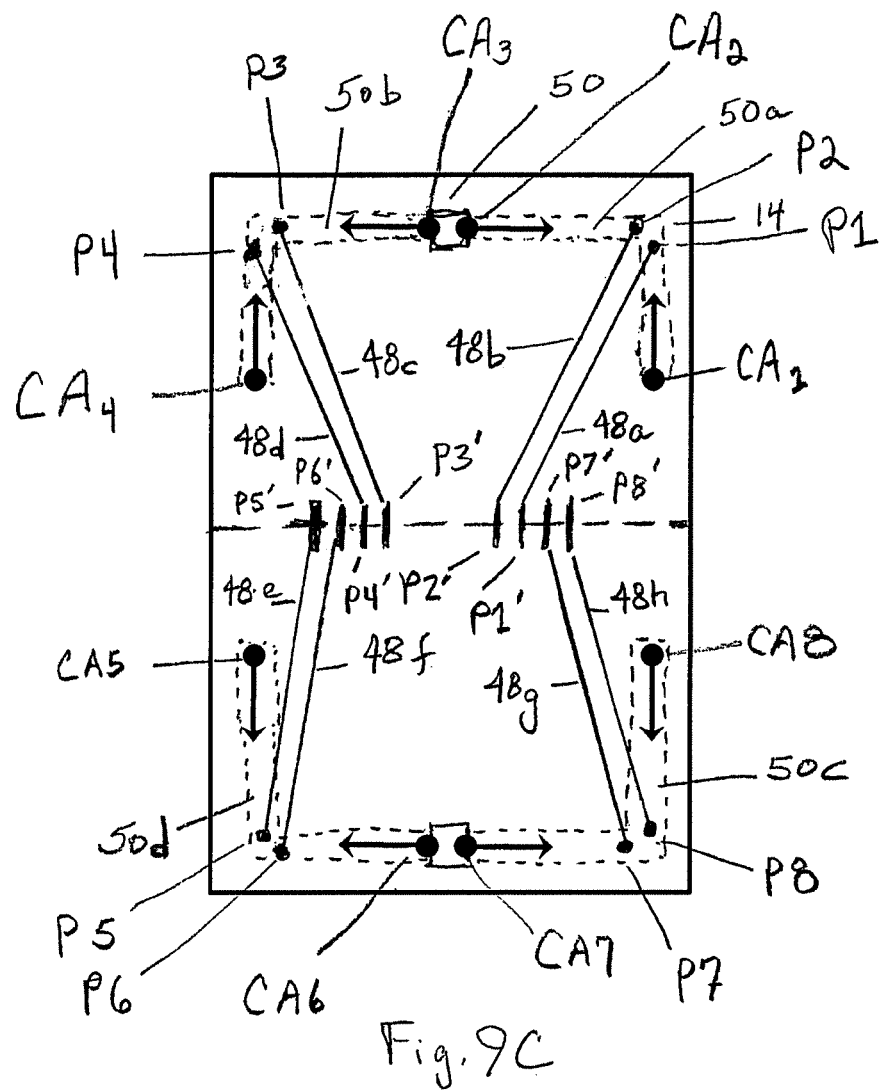

FIG. 9C illustrates diagrammatically the CNC embodiment of FIG. 3. FIG. 9C is a top planar view looking down on the platform and all the cable attachment points and pulley locations appear to lie in horizontal planes, in which they typically do. These points do not necessarily need to lie in horizontal planes and may be arrayed in any configuration that gives sufficient space in terms of distance between the attachment points and in terms of different vectors or directions of the cables so as to ensure stability of the platform and controllability of the motion.

More specifically, FIGS. 3 and 9C illustrate a CNC embodiment in which a pair of legs 50 descend below platform 14. Each of the legs may have leg extensions 50a/50b/

50c/50d, which are typically horizontal (when the platform is at rest) and provide a multiplicity of cable attachment points CA1-CA8 for the attachment of cables 48a-48h, respectively, to drive the platform. Pulleys P1-P8 and P1'-P8' entrain each of the cables 48a-48h, respectively, these may be termed platform load bearing pulleys as they support (thru the entrained cables) the platform load (including any load generated by tension springs 33). It is understood that pulleys P1-P/8 and, to some extent, P1'-P1'8 (and indeed any of the pulleys set forth herein), are typically "soft mounted" or flexibly mounted at their mounting points to the base. By soft mounting 37 (see FIG. 3), this typically means a mounting such that the pulley can follow the cable as the platform moves. For example, an eyebolt may be used with a leg attached to the base and a flexible member attaching the eye of the eyebolt to the axis of rotation (typically the axle) of the pulley. In a like manner or any suitable manner, pulleys P1'-P8' that typically provide change of direction for the cables they entrain may be provided with some flexibility of movement. The flexible or soft mounting of pulley to base connections help ensure that the cables stay entrained upon the pulleys while the platform moves through its programmed pattern.

There is some redundancy in the FIG. 3/FIG. 6 configuration of the CNC. Typically, a minimum of three attachment points and six cables may be used (see, for example, FIG. 9A) to provide motion in six degrees of freedom. Moreover, Applicant's cable driven platform may be provided in embodiments that have less than six degrees of freedom. For example, a three cable variation may be provided on three attachment points (see the configuration of FIG. 9A), along with at least three load bearing pulleys, three cam follower assemblies, and three cams. Such a configuration may be used to provide, for example, motion in three degrees of freedom, such as planar motion with two orthogonal translational degrees of freedom, and one rotational degree of freedom. Such a configuration may also provide motion to a platform that has degrees of freedom controlled or is supported in another manner. For example, the platform may be connected to the base by way of a single ball-and-socket pivot joint, and so have freedoms to roll, pitch, and yaw that are controlled by the cables (see FIG. 14B).

With the configuration of FIGS. 3 and 9C (that is, four pulley points or areas/eight cable attachment points) in mind, it can be seen intuitively how motion in roll, pitch, and yaw be generated. For example, in simple intuitive terms, basic roll motion may be generated by having cables CA3,4,5,6 pull on the attachment points with relaxation on the other cables. Pitch may be generated by a pull on CA1,2,3,4 and relaxation on the other attachment points. Yaw may be generated by a pull on CA1,3,5,7 with relaxation at the other attachment points.

Translational platform motion may also be generated, for example, in looking at FIG. 9C (top planar view), "right," "left," "up," "down," and "out of the page and into the page." A pull on all attachment points or relaxation of all will generate out of the page and into the page movement. Left motion may be generated by a pull at CA3/CA6 with relaxation at CA2/CA7 (move to the left as seen in FIG. 9C). Movement towards the top of the page on FIG. 9C may be generated by pull on cables on CA1/CA4 along with relaxation on CA5/CA8. Complex motion in multiple axes, in up to all six degrees of freedom, may be generated by various cam combinations of cam generated cable pull.

In a CNC version, the cam follower assemblies 18 are typically arranged in a row, and pivot independently on a common cam follower axis member 35 fixed to the base (see FIGS. 3 and 11). In one embodiment (FIG. 7C), a pivoting member 18a shaped like a lever is provided pivoting about hinges 19 on axis member 35 on one end, and attaching to the cable 48 on the other end. Between the ends is mounted a rolling element or cam follower 21, such as a bearing, that rolls in contact with the cam (see FIGS. 6 and 7C). As the cam lobe 20a undulates by way of a typically non-concentric shape, it pushes on the cam followers 21 and causes the pivoting member 18a to pivot about its axis on hinge 19. This motion, in turn, pulls on the cable 48 which ultimately drives the platform 14. The cam 20 and cam follower 21 can be configured in various ways (see FIG. 11, for one example). In FIGS. 7A-7C, it is seen that any cam follower assembly may be configured as a Class 1 lever with fulcrum axis mounted between cable and cam (FIG. 7A), as a Class 2 lever with cable attached between fulcrum and cam (FIG. 7B), or as a Class 3 lever with cam roller mounted between fulcrum and cable (FIG. 7C). Regarding attachment of the cable ends to the pivoting member 18a, an articulated joint, such as a fork with the removed ends having an axle for engaging the pivoting member 18a may be used. Indeed, a ball joint may be used to provide articulated motion between the cable at cable end and the cam follower assembly 18. Moreover, in some of the two-way positive embodiments set forth herein, a pair of articulated joints (such as two forks) may be utilized to engage the pivoting member 18a of the cam follower assembly 18. FIG. 13A illustrates a "captured" roller assembly. Rolling element 21 is optional as the cam may directly control the pivoting member in a sliding relationship.

Figure 15B:
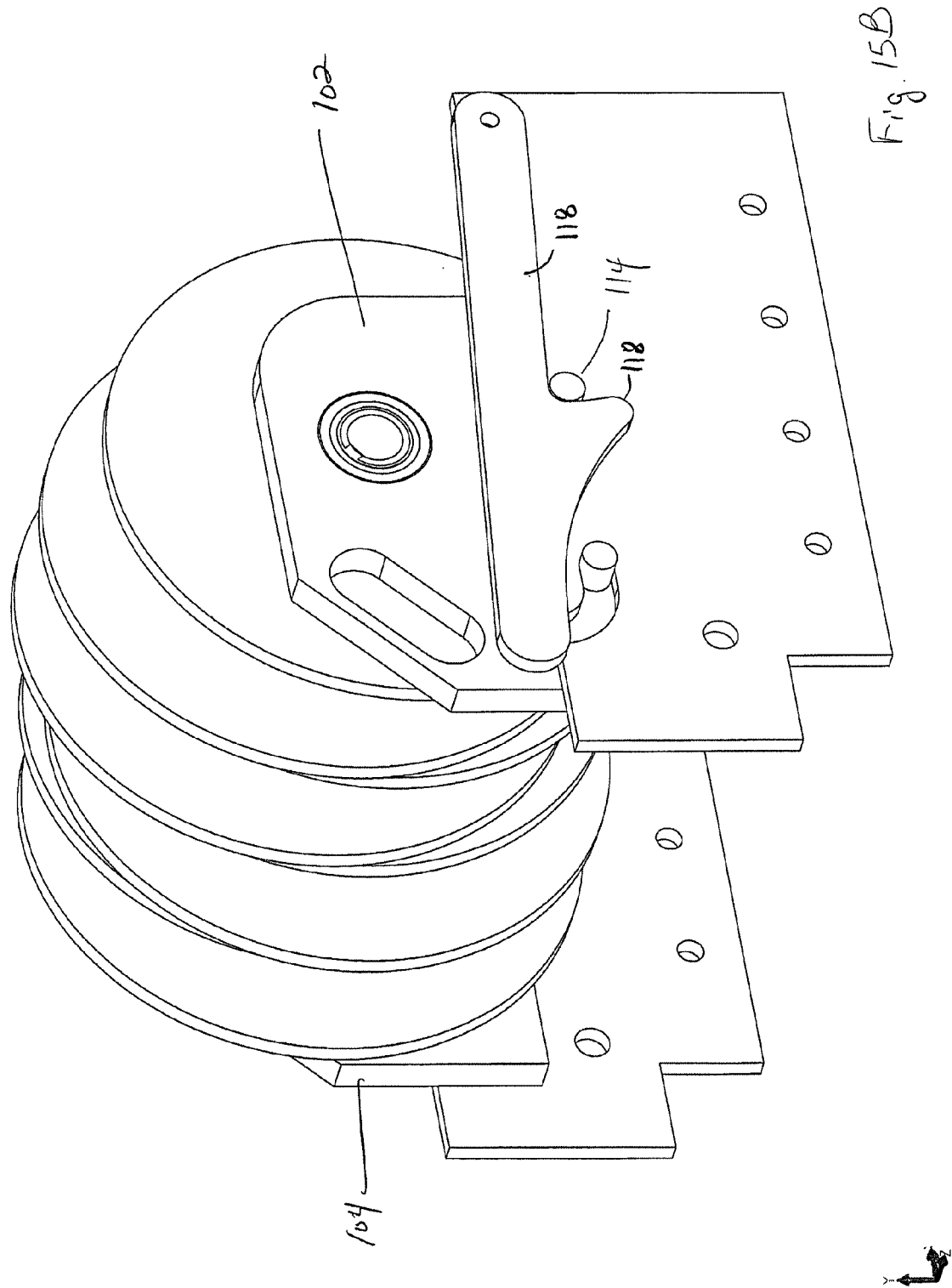
Figure 15D:
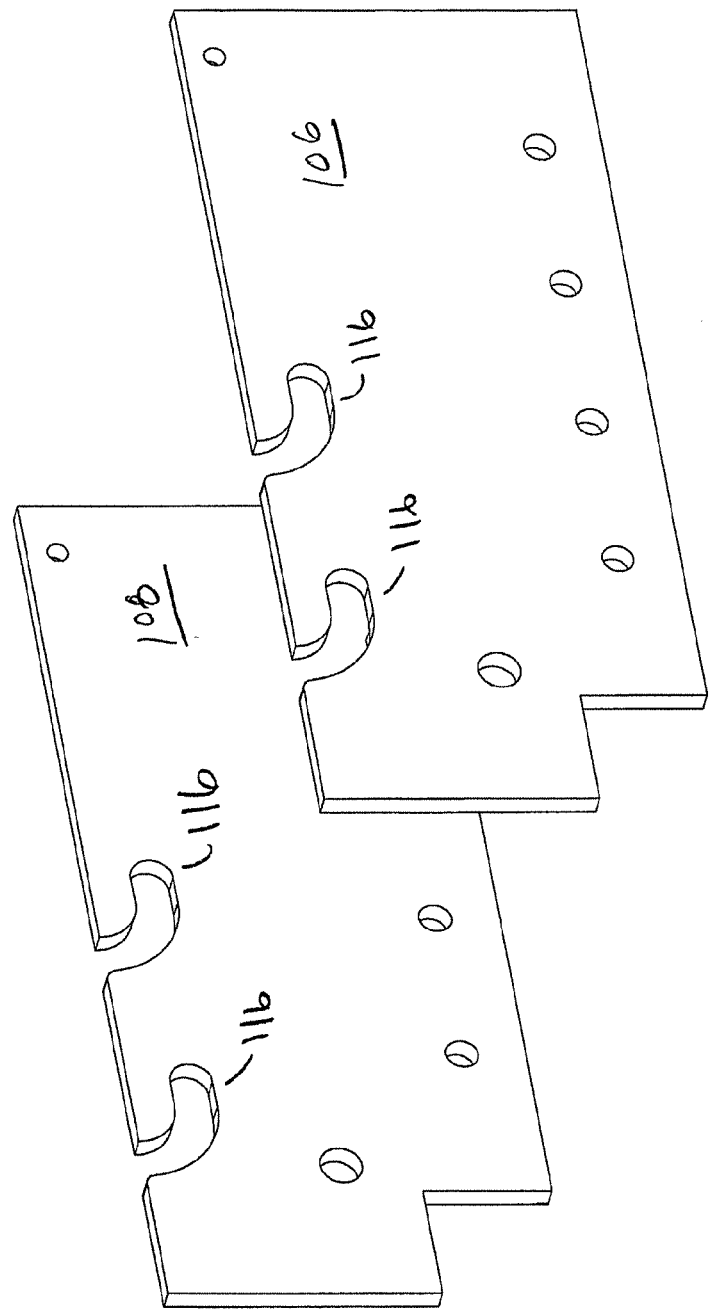
Figure 15E:
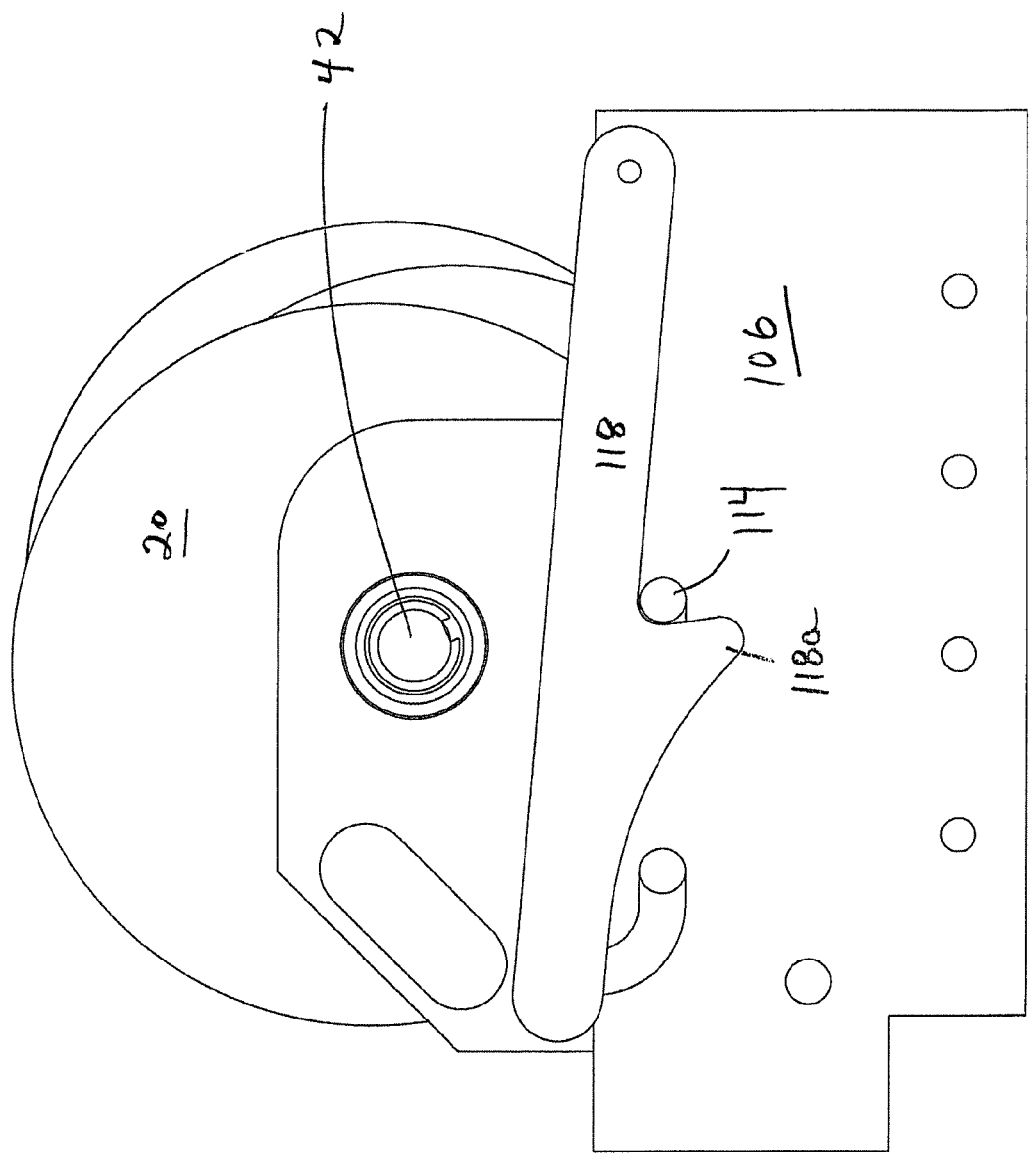
Figure 15F:
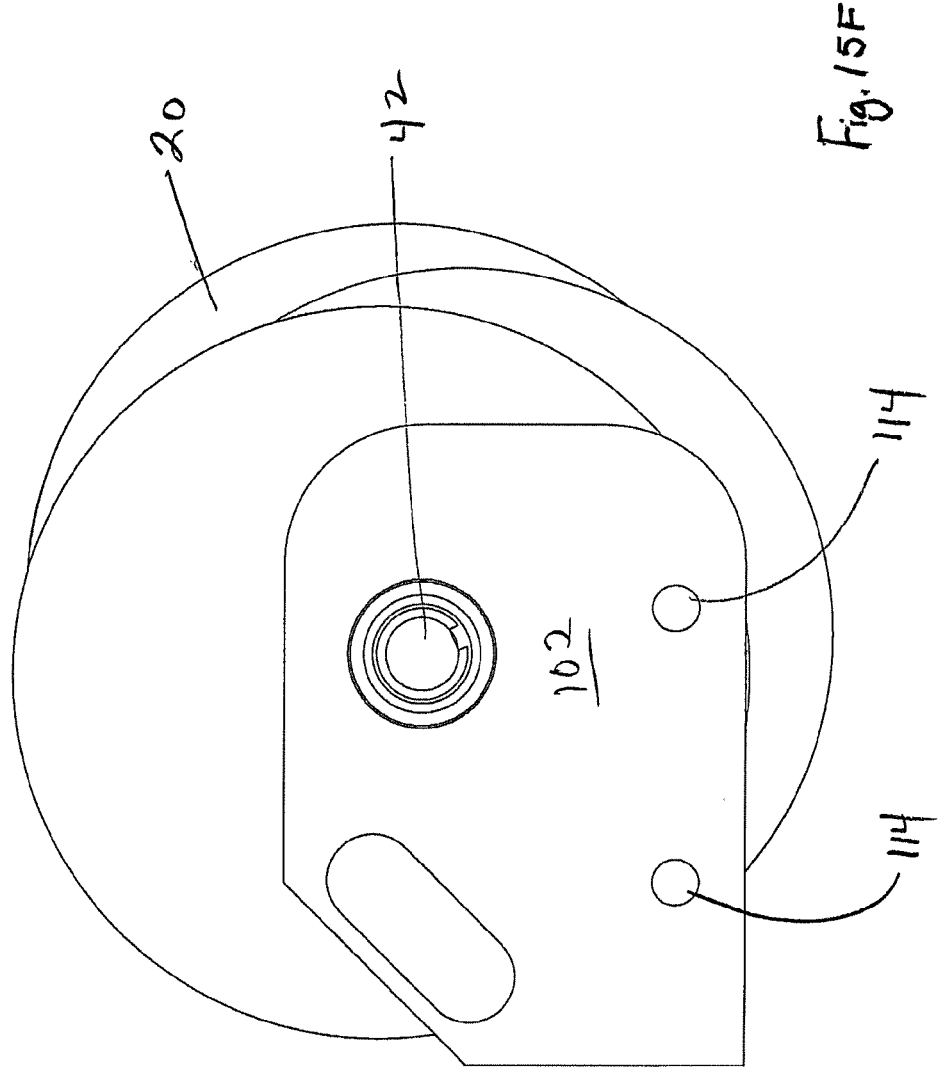
Figure 15G:
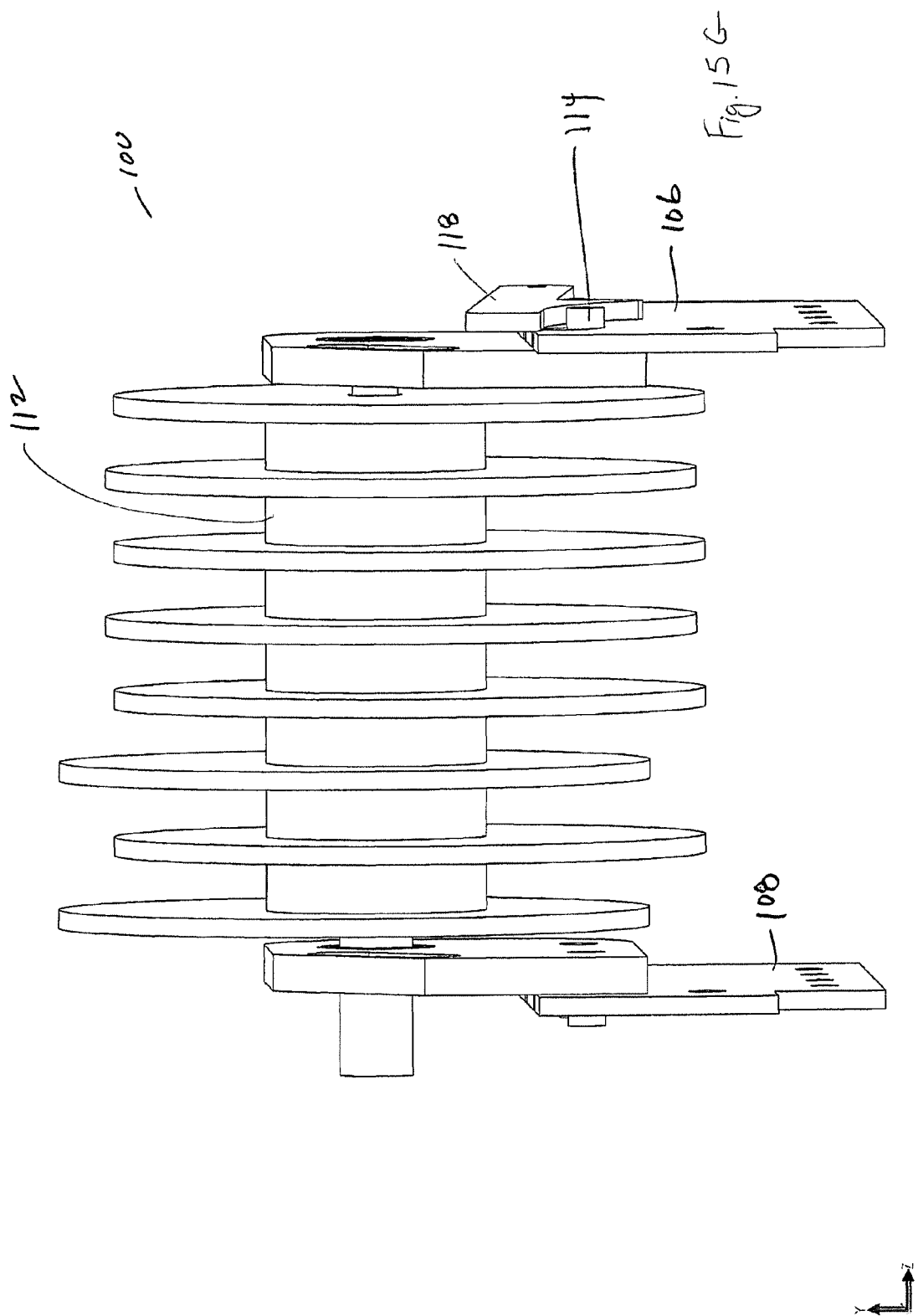
Figure 15H:
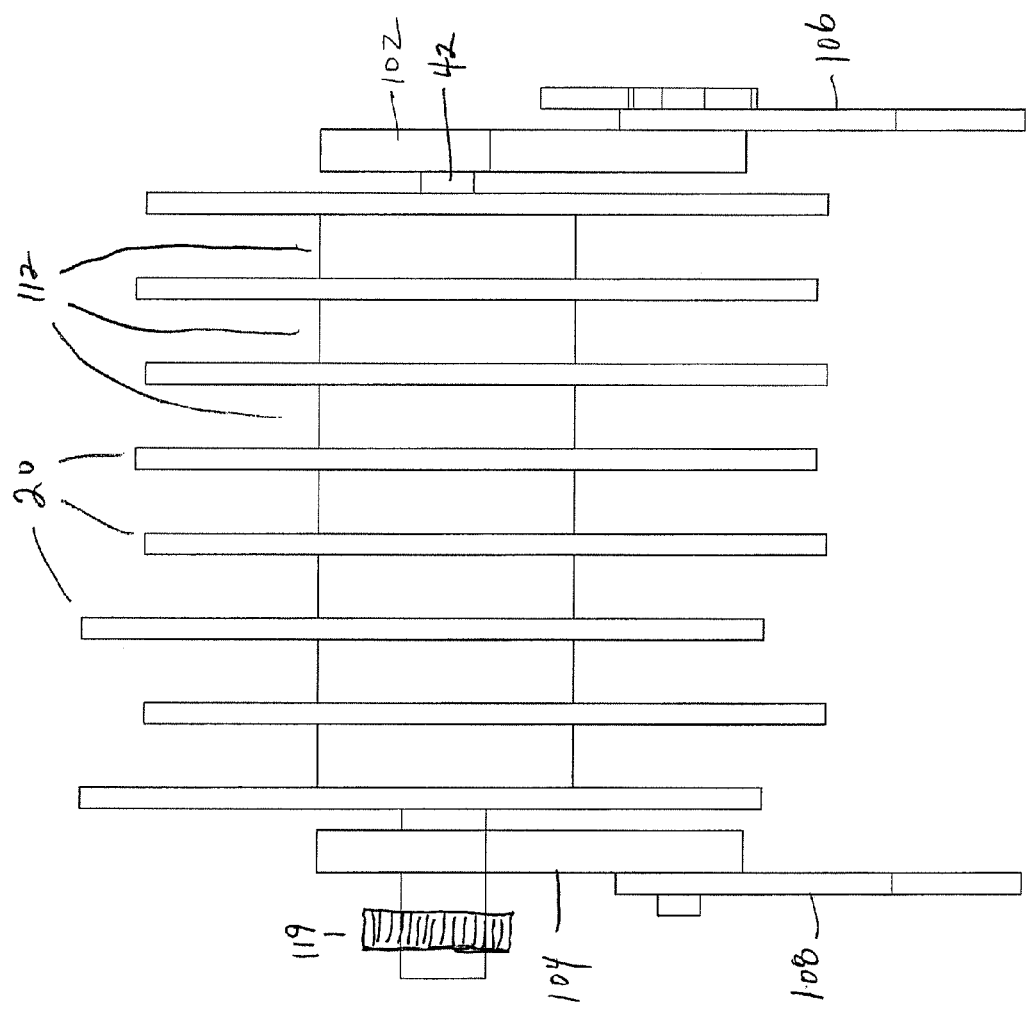

For both the SNC and CNC versions, the cams themselves are typically arranged in a row, and rotate all together as a single cam unit 100 (see FIGS. 15A and 15G) on a common shaft 42 (which may be a drive shaft) mounted to the base and driven by the motor (FIGS. 6, 10A, 10B, and 11). The various cams typically have different shapes so as to drive the platform in the preferred motion pattern. In the preferred embodiment the camshaft and set of mounted cams is a single cam unit 100 (see FIGS. 15A and 15G) that can be interchanged so as to provide various motion pattern programs with the same apparatus (see FIG. 11). However, cams do not need to be on a common camshaft, they may be on separate shafts, synchronized, for example, on meshing gears. The cam-sets may be constructed to generate a variety of motion patterns including those of various horses, of various horse gaits (e.g., slow walking, fast walking, trot), of a human gait, or gentle rocking, of a machine tool path, of a laser beam path, a tool, an instrument, a nozzle, a fan, a weapon, a laser, a light, a sensor, a jet, a wand, a flag or any form of directional emitter, receiver or virtually any motion pattern.

In FIG. 10 (the CNC version), tension springs 33 may be added, such as between the top of the base and the platform, to provide additional support and stability to saddle 13. One advantage of the CNC configuration (and even the SNC to some degree) is that, being suspended upon cables, the platform has some degree of flexibility to move in response to the rider's own body motions. That is, the primary movement pattern is directed and controlled by the rotating cams, but the rider can also influence the platform motion in subtle ways. The springs can provide additional support and stability to keep the platform motion from straying too far from the direction motion pattern.

In the various embodiments of the SNC and CNC embodiments illustrated above, cables are seen to drive a platform, a minimum of six cables for driving the platform in six degrees of freedom. Furthermore, in the embodiments illustrated support of the platform is typically achieved by attachment to the cables. The cables in the CNC version are both supporting the platform load and providing drive functions for driving the platform with respect to the base. In the embodiments illustrated in FIGS. 14A-14E, it may be seen that there are embodiments of Applicant's multi-dimensional movement generating device 10, in which there are non-cable, mechanical couplings that may constrain movement between the base and the platform. This may be springs as in the SNC version above or hard link mechanical (non-cable) couplings as set forth more specifically in FIGS. 14A-14E.

FIG. 14A illustrates a hinge coupling 130, between the base and the platform in a manner that limits the platform to one degree of freedom (pitch) and thus needs only a single cable for achieving drive motion and, in some respects, load support. Incidentally, platform 14 illustrates accessory support members 132, here taking configuration of a pair of members projecting upward from platform 14, for attaching any accessory or any other tool or implement to the platform. Accessory support members 132 may be used with any platforms disclosed herein. Springs (not shown) may also be used with any of the embodiments set forth in the FIG. 14 series discussed hereinbelow.

FIG. 14B illustrates a single ball-and-socket coupling 140 to mechanically, hard couple platform 14 to base 12. It is seen that, while roll, pitch and yaw may be achieved with a single ball-and-socket between the platform and the base, there is no translational motion in x, y or z axes. Thus, platform 14 is only capable of three degrees of freedom, necessitating a minimum of three cables attached to the platform control movement about, roll, pitch, and yaw.

Figure 14C:
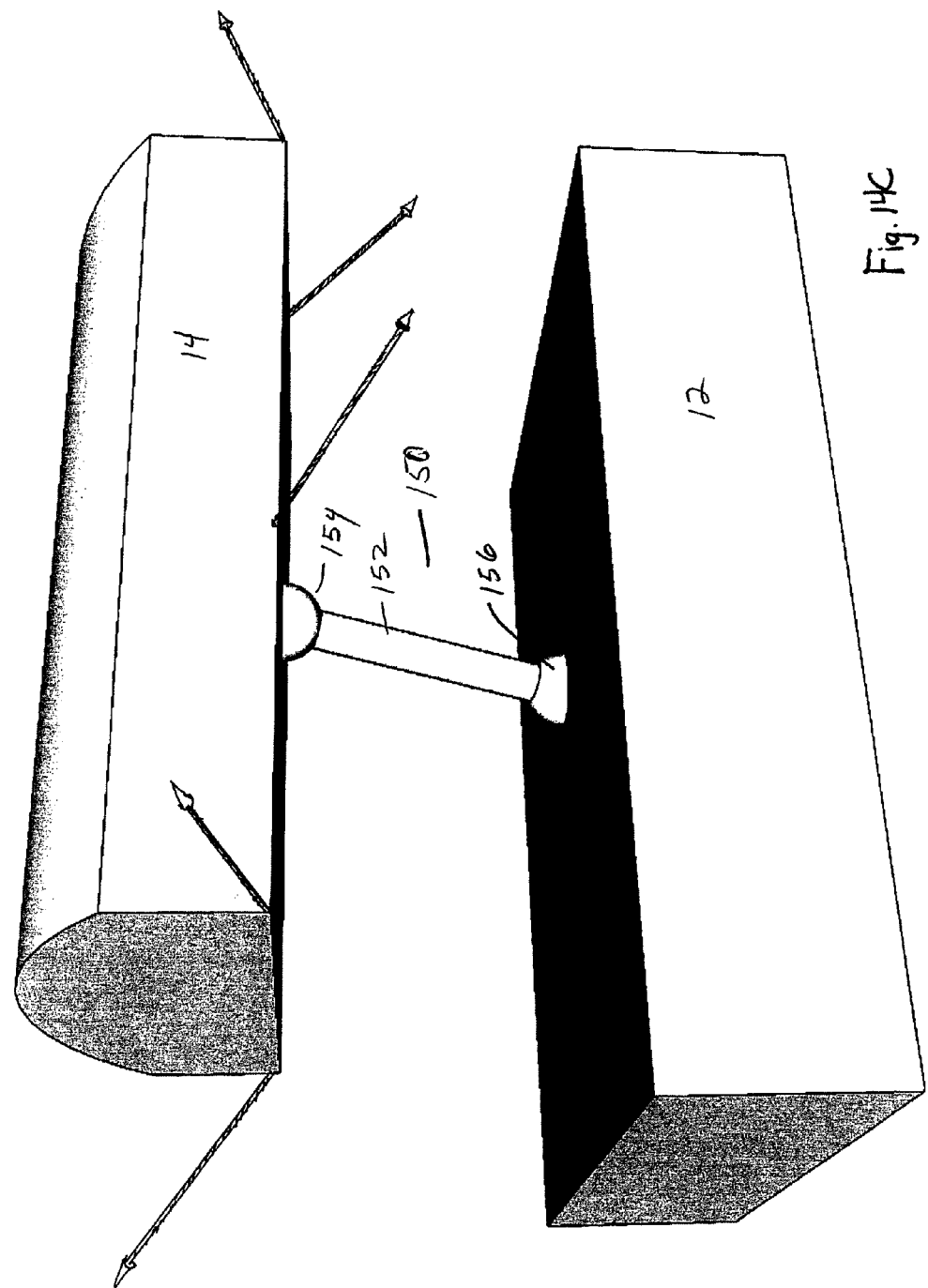

Turning to FIG. 14C, a single strut/tie rod end combination 150 is seen comprising a single strut tying in, with a tie rod end (ball-and-socket) at one end 154 to platform 14 and at the other end 156 to base 12. The single strut having articulated joints at ends 154/156 thereof is seen to provide all but one degree of freedom. The strut prevents platform from moving about an axis up and down or pure translational motion with respect to the view set forth in FIG. 14C. This embodiment having five degrees of freedom needs at a minimum five cables to both provide platform support and drive motion in the five degrees of freedom.

Figure 14D:
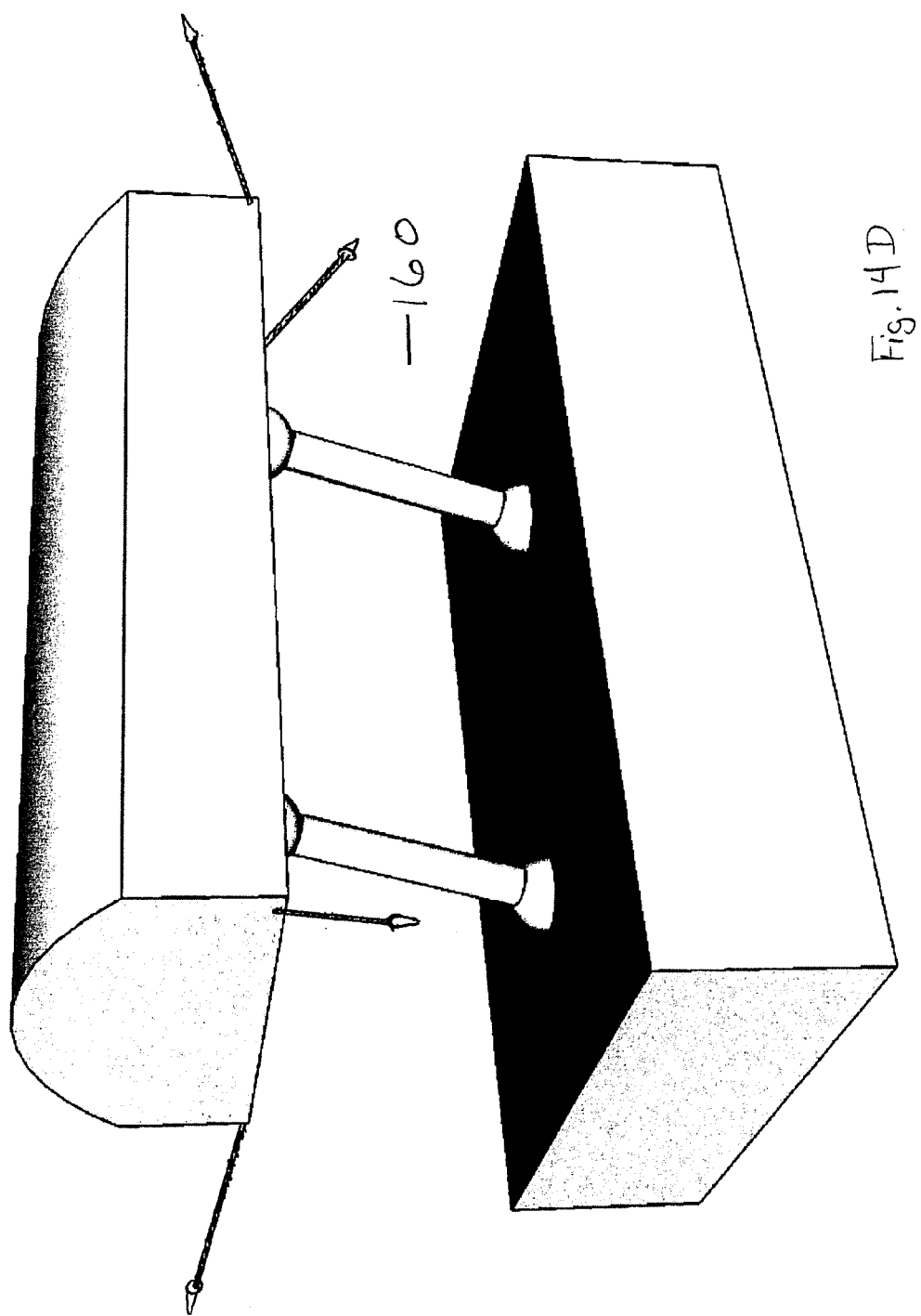

FIG. 14D is a two strut variation 160 of the single strut illustrated in FIG. 14C above. Not only is the motion constrained as set forth with respect to the single strut variation 150 illustrated in FIG. 14C, but there is no pitch either and thus a second degree of freedom is constrained, leaving only four degrees of freedom and a minimum of four cables. Note in the illustration of FIG. 14D, the struts articulate at tie rod ends.

Figure 14E:
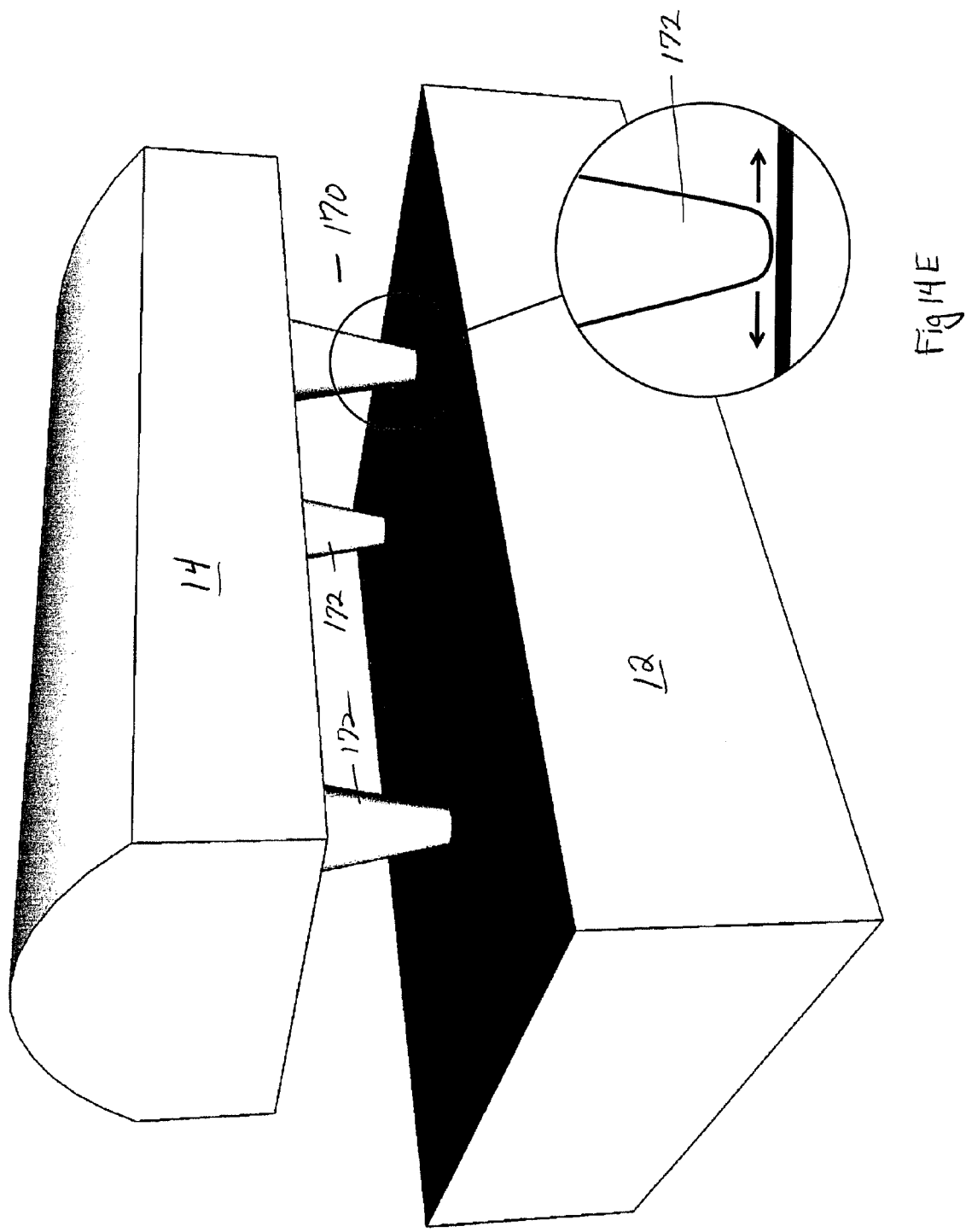

In FIG. 14E, a sliding joint, non-cable, hard coupled mechanical linkage between base 12 and platform 14 is illustrated. Sliding joint 170 is seen in detail, wherein the removed ends of at least three legs are provided for sliding engagement with an upper surface of base 12. This sliding joint 170 and may have one, two, three or more legs for constraining different movement. In the configuration illustrated in FIG. 14E, there is no roll or pitch movement nor translational about a vertical axis. Thus, three cables at a minimum are provided for providing directional force and movement of the removed end of the legs across the flat, upper surface of base 12. It may be seen that one or two legs may be provided with additional cables for other movement, for example, two legs aligned providing either roll or pitch movement, which movement is eliminated in the three legged sliding joint configuration illustrated in FIG. 14E.

In all of the foregoing, it is anticipated that pulleys will typically be used, for example, when there is some vertical support function to the cables (that is, the cables provide some support of the platform), when platform motion in a specific direction is required and/or when there is some change of direction desired, for example, routing cables to the cam follower assemblies. The minimum number of cables, cables/pulley combinations, or cable/pulley/spring sets are determined by the number of degrees of freedom provided by the combination, or the combination along with a non-cable, hard mechanical coupling (which eliminate one or more degrees of freedom) are provided by the number of degrees of freedom that such combination provides. Each cable or cable pulley combination may provide a cable attachment to the platform, along with pulley attachment to the base that generates at least an x or y or z axis force vector component at the cable attachment point in the available degree(s) of freedom.

However, it is seen with respect to FIG. 16 that pulleys are not always necessary. That is, in FIG. 16, it is seen that cables alone, without base supported pulleys, may support and drive the platform. More specifically, when some portion of the platform is below the cables and the cable and cam assembly is supported on a base located above the suspended platform or portions of the platform, pulleys may not be necessary.

In the embodiments illustrated in FIGS. 14A-14H, it is understood that the direction of the cables may be any suitable direction with the use of pulleys which may provide some support to the platform and will change the direction of the cables so that they are directed toward the cam followers. Moreover, it is seen I the FIG. 14 series that the minimum number of cables are shown, for example, with one degree of freedom, one cable; two degrees of freedom, two cables; three degrees of freedom, three cables; etc. Although no springs are shown, springs may be used to provide a soft coupling between the base and the platform, and may be used in either tension or compression as more specifically set forth in these specifications. Springs may also serve to provide "soft constraint" to a degree-of-freedom, in which case, fewer cables may be used, but this would allow some softness in control of the motion, which may be acceptable.

Turning now to FIGS. 15A-15H, details of Applicant's single cam unit 100 may be appreciated. Cam unit 100 may be comprised of multiple aligned cams 20 on a keyed camshaft 42. A pair of substantially similar plates 102/104 are spaced apart on camshaft 42. Plates 102/104 are fixed in a position longitudinally with one another, for example, by a brace 110 or they may be mounted by elements locked to camshaft 42 to prevent substantial axial movement of plates 102/104 and cams 20 with respect to the shaft. Spacers 112 may be seen separating adjacent cams 20 in FIG. 15H to provide proper alignment with base mounted, aligned, cam follower assemblies. Engagement stubs 114 are seen to project outward from plates 102/104 for engagement with a pair of spaced apart base supported, generally tabular frame members 106/108. More specifically, engagement stubs 114 cooperate with arcuate slots 116 in base supported frame members 106/108. A frame member 106/108 mounted, pivoting locking arm 118 with extension 118a is seen to engage at least one of the engagement stubs 114 (see FIG. 15B). When single cam unit 100 is slid into position between members 106/108 and engaging the frame and cam followers, members 106/108 hold plates 102/104 adjacent cam follower assemblies.

It is understood that each cam is keyed to camshaft 42 to locate it with respect to adjacent cams and with respect to the camshaft and the cams 20 rotate together as a unit. It would be apparent to one of ordinary skill in the art where to place bearings and the like for ensuring smooth and efficient movement of the camshaft with respect to plates 102/104. A spur gear 119 may be located at one end of camshaft 42 may be located to engage a meshing gear (not shown) of the gearbox 40 or located on a driveshaft of the motor.

Figure 17:
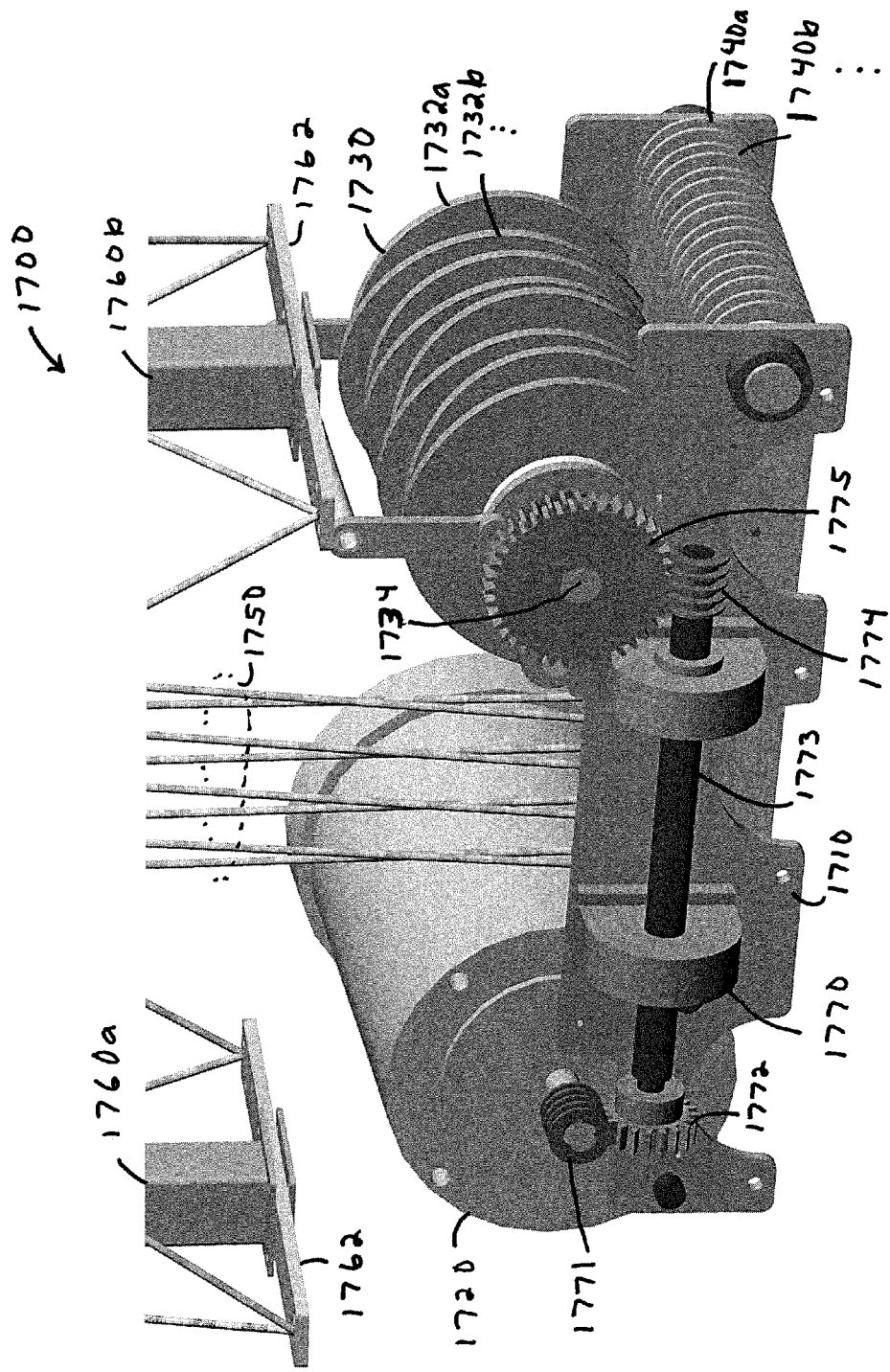
FIG. 17 is a perspective view of another example cam-controlled support platform, wherein rotational power from a motor is delivered to a cam assembly by way of worms, worm gears, and a drive shaft.

FIG. 17 illustrates another example cam-controlled support platform 1700. Among other things, system 1700 includes a base 1710, a motor 1720, a cam assembly 1730, cam follower assemblies 1740, and a multiplicity of cables 1750. Base 1710, motor 1720, cam assembly 1730, cam follower assemblies 1740, and cables 1750 may be similar to those already discussed. For example, cam assembly 1730 includes a number of cams 1732 that are coupled to a cam shaft 1734.

System 1700 also includes platform supports 1760 (only a portion of which can be seen). Platform supports 1760 may generally support any type of platform. In this implementation, platform supports 1760 include flexing members 1762 to which cables 1750 attach (possibly after being redirected by a system of pulleys above the attachment points).

Flexing members 1762 allow for flexing in the vertical direction under load (e.g., static and/or dynamic). In the illustrated implementation, flexing members 1762 are horizontal plates. The horizontal plates typically flex up to a few millimeters when under load, but may flex up to around ten millimeters under heavy load. The horizontal plates may be made of spring steel or any other appropriate flexible high-strength material. In other implementations, flexing members 1762 may be composed of other flexible components (e.g., springs).

Flexing members 1762 provide a shock absorbing function during dynamic loading and also assist in distributing tension between the cables. For example, if one cable at an attachment point has more tension than another, a flexing member 1762 may twist slightly to distribute the load between the cables. In implementations in which a human is on the platform, the flexing of the horizontal members can provide a smoother ride.

System 1700 also includes a transmission 1770 for conveying power from motor 1720 to cam assembly 1730. Transmission 1770 includes a worm 1771, a worm gear 1772, a drive shaft 1773, a worm 1774, and a worm gear 1775. In operation, motor 1720 turns worm 1771, which meshes with worm gear 1772, turning it. Worm gear 1772 is coupled to drive shaft 1773, which turns worm 1774. Worm 1774 meshes with worm gear 1775, to turn it. Worm gear 1775 is coupled to cam shaft 1734 of cam assembly 1730, to thereby turn it. The cam shaft turns the set of cams 1732 in response to power from motor 1720.

The meshing of worm 1771 and worm gear 1772 and the meshing of worm 1774 and worm gear 1775 may be lubricated by various techniques. For example, in particular implementations, a worm and an associated worm gear may be enclosed in an oil reservoir box for lubrication. As another example, the meshing of a worm and a worm gear may be lubricated by grease. An open box may, for example, serve as a grease catch.

Transmission 1770 allows cam assembly 1730, along with worm gear 1775, to be readily disengaged from transmission 1770. Cam assembly 1730 may then be serviced or interchanged with another cam assembly, which may be a replacement and/or provide a different movement (e.g., due to a different shape of its cams). Transmission 1770 also allows system 1700 to be more compact and for motor 1720 to be placed on its side. A transmission like transmission 1770 may generally be used with any of the embodiments contemplated herein.

Although system 1700 is shown with eight cams 1732 and eight cables 1750, systems similar to system 1700 may use any other number of cams and cables. For example, a system may have six cams and six cables. As another example, a system may have ten cams and ten cables. Additionally, a system may have more than one cam assembly and associated cable group, all of the cam assemblies being driven by the same motor or one or more cam assemblies being driven by an additional motor. As a further example, a system may use a different transmission (e.g., chain and sprocket).

Figure 18:
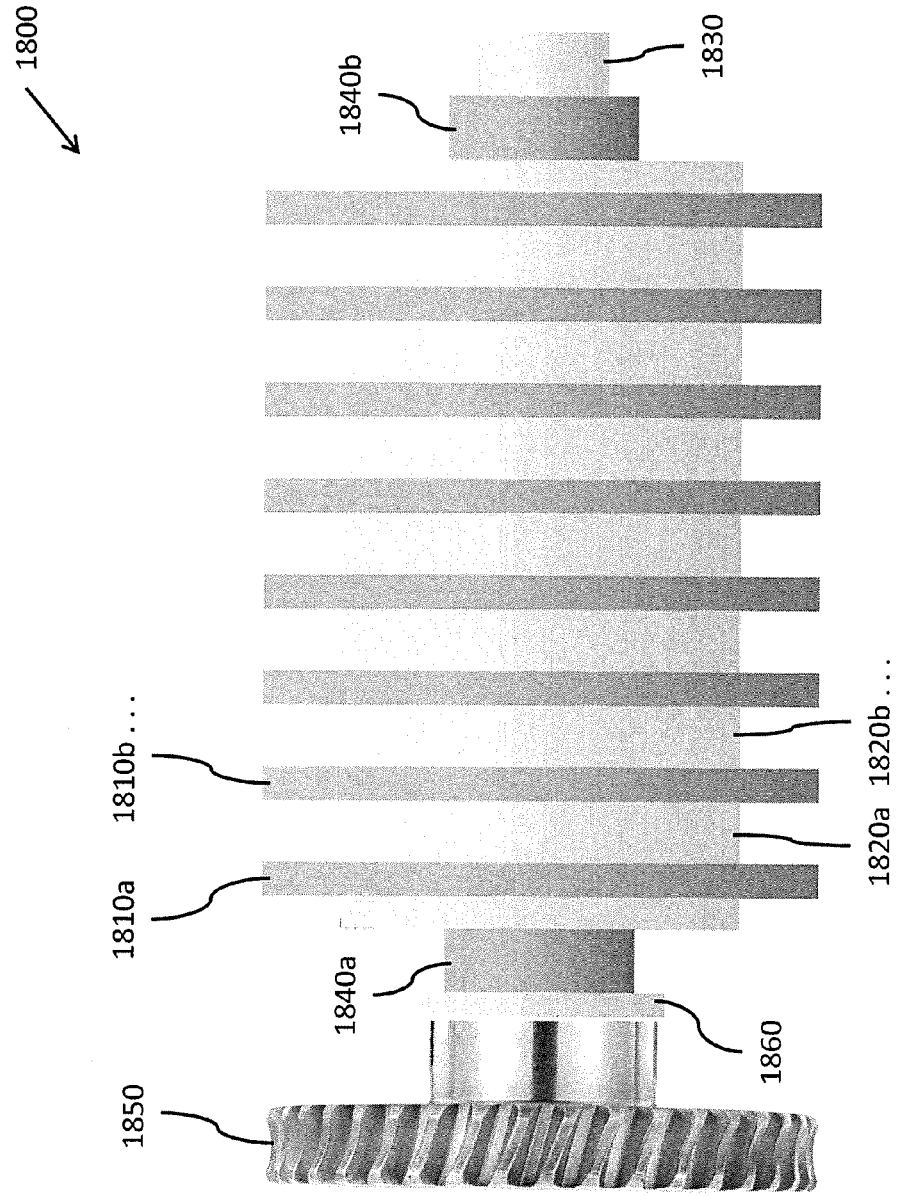
FIG. 18 is a side view of an example cam assembly.

FIG. 18 illustrates an example cam assembly 1800. Cam assembly 1800 may, for example, be used in a system similar to system 1700.

Cam assembly 1800 includes a number of cams 1810, which are separated by cam spacers 1820. Cams 1810 may have varying shapes relative to each other. Cams 1810 are coupled to a cam shaft 1830 and are rotationally driven thereby. Cams 1810 may be coupled to camshaft 1830 by any of a variety of techniques. For example, cams 1810 may be welded to camshaft 1830. In particular implementations, cams 1810 may be coupled to cam shaft 1830 by cam shaft 1830 being keyed and cams 1810 having a corresponding keyway.

In a keyway implementation, slack between the keyway, key, and cams may be reduced or eliminated by, for example, tightening tolerances and/or inserting one or more rods into holes through the cams, thereby holding the cams together. Additionally, the rods may hold the cams firmly against the key. If needed, the holes in each adjacent cam could be offset slightly so that the rod is slightly deflected through each hole and thereby tends to press the cams back against the key.

At each end, cam assembly 1800 includes a bearing 1840. Bearings 1840 allow cam assembly 1800 to be supported (e.g., by a base) while allowing cam shaft 1830 to rotate. At one end, cam assembly 1800 includes a worm gear 1850. Worm gear 1850 is spaced from bearing 1840a by gear spacer 1860. Worm gear 1850 is coupled to cam shaft 1830 and is driven by an intermeshing worm (not shown) to drive cam shaft 1830 and, hence, cams 1810.

Figure 18A:
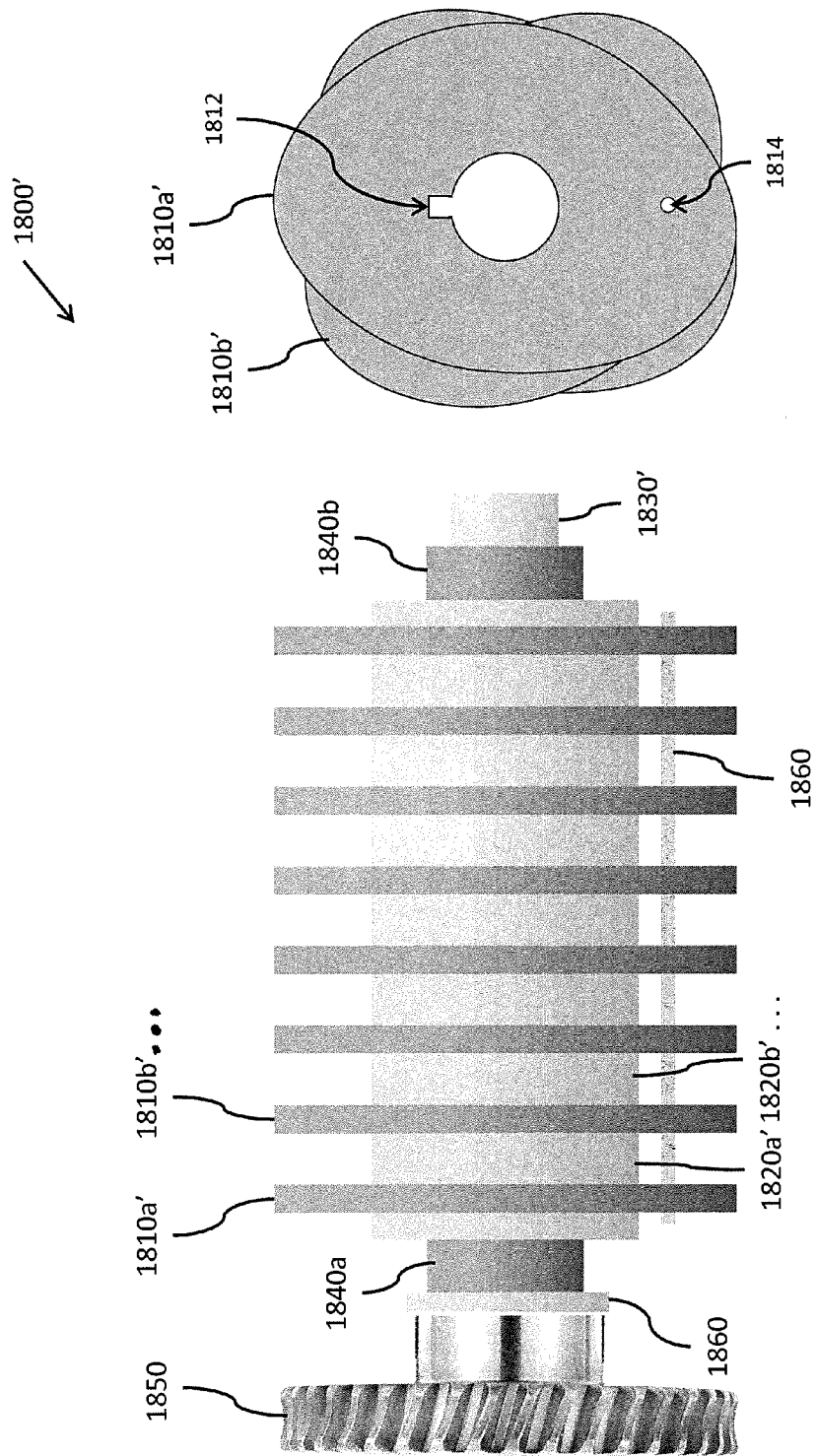
FIGS. 18A-18A' respectively illustrate a side view of another example cam assembly and a front view of cams for the assembly.

FIGS. 18A-18A' illustrate another example cam assembly 1800'. Cam assembly 1800' may, for example, be used in a system similar to system 1700.

Similar to cam assembly 1800, cam assembly 1800' includes a number of cams 1810', which are separated by cam spacers 1820'. Cams 1810' may have varying shapes relative to each other. Cams 1810' are coupled to a cam shaft 1830' and are rotationally driven thereby. In particular, cam shaft 1830' is keyed so that cams 1810' rotate therewith. Correspondingly, each cam 1810' includes a keyway 1812 that meshes with the key in cam shaft 1830'. Each cam 1810' also includes an aperture 1814, which is engaged by a structural member 1860 (e.g., a rod).

Although keying camshaft 1830' to mesh with keyway 1812 in cams 1810' allows the cams to turn with camshaft 1830', some slack may still be experienced between the cams, which may, for example, be felt by a rider on an associated platform. To assist in overcoming this, structural member 1860 is inserted parallel to camshaft 1830' through aligned apertures 1814 in adjacent cams 1810'. In essence, structural member 1860 acts as another key, and apertures 1814 act as another keyway. But apertures 1814 are removed radially from the center of camshaft 1830 so that cam rotational displacements are magnified (e.g., keyways 1812 may only be only about 0.5 inches (13 mm) from the center, whereas apertures 1814 may be about 2 inches (51 mm) from center).

In particular implementations, apertures 1814 in adjacent cams could be intentionally offset by a slight amount so that passing structural member 1860 through would require the structural member to "snake" a little. The offset of the apertures and/or the bending of the structural member would cause cams 1810' to press back against the keyed camshaft 1830' (putting the keyway and the structural member in opposition to each other so as to eliminate any slack).

At each end, cam assembly 1800' includes a bearing 1840. Bearings 1840 allow cam assembly 1800' to be supported (e.g., by a base) while allowing cam shaft 1830' to rotate. At one end, cam assembly 1800' includes a worm gear 1850. Worm gear 1850 is spaced from bearing 1840a by gear spacer 1860. Worm gear 1850 is coupled to cam shaft 1830' and is driven by an intermeshing worm (not shown) to drive cam shaft 1830' and, hence, cams 1810'.

FIGS. 19A-F illustrate an example cam-controlled support system 1900. Among other things, system 1900 includes a base 1910, a cam assembly 1920, cam follower assemblies 1930 (only one of which can be seen), a multiplicity of cables 1940, and a transmission 1950. Base 1910, cam assembly 1920, cam follower assemblies 1930, cables 1940, and transmission 1950 can generally be constructed as discussed previously. For example, cam assembly 1920 includes a number of cams 1932 that are coupled to a cam shaft 1924.

Base 1910, cam assembly 1920, and transmission 1950 are, however, constructed to allow the cam assembly to be readily removed from system 1900. In particular, base 1910 includes two sockets 1912 to receive cam assembly 1920. Cam assembly 1920 may, for example, include bearings that may be inserted into sockets 1912 to allow cam shaft 1924 to be rotated while cam assembly is held in sockets 1912. Cam assembly 1920 also includes a handle 1926 and two mounting arms 1928, which each have a nub 1929 on an outer end thereof.

As shown in FIG. 19A, cam assembly 1920 is engaged with sockets 1912 by being received therein. In this position, a worm 1952 and a worm gear 1954 of transmission 1950 are engaged so that transmission 1950 can drive cam assembly 1920. Cam assembly 1920 is prevented from moving to the left, up, or down by being received in sockets 1912. Additionally, nubs 1929 prevent cam assembly 1920 from moving to the right by extending around the outside of sockets 1912.

To begin removing cam assembly 1920 from system 1900, handle 1926 is rotated towards the opening of sockets 1912, which causes arms 1928 and nubs 1929 to begin rotating around sockets 1912, as shown in FIG. 19B. Continued rotation of handle 1926 causes nubs 1929 to disengage from the outside of sockets 1912, as shown in FIG. 19C. Cam assembly 1920 may then be pulled away from sockets 1912 (e.g., by using handle 1926), as shown in FIG. 19D. This movement also disengages cam assembly 1920 from transmission 1950 by separating worm gear 1954 from worm 1952. Further pulling of the cam assembly 1920 away from sockets 1912 (e.g., by using handle 1926) separates cam assembly 1920 from the sockets, as shown in FIG. 19E. Then, cam assembly 1920 may be completely removed from system 1900 by continuing to move it away from sockets 1912, as shown in FIG. 19F. (Installing a cam assembly into system 1900 may be performed by reversing the order.)

As illustrated, system 1900 allows cam assembly 1920 to be readily disengaged and removed from system 1900. Cam assembly 1920 may then be serviced or interchanged with another cam assembly, which may be a replacement and/or provide a different movement (e.g., due to a different shape of its cams).

Although FIG. 19 illustrates one implementation of a cam-controlled support system with a removable cam assembly, other cam-controlled support systems may have a removable cam assembly. For example, a cam-controlled support system with a chain drive (as opposed to a worm drive) may have a removable cam assembly, as demonstrated in FIGS. 15A-H. Additionally, a cam-controlled support system may couple to the base in a different manner (e.g., stubs that engage slots, as in FIGS. 15A-H).

To assist in removing a cam assembly, the forces applied to cams 1922 by the cam followers may be reduced prior to removal. For example, in implementations in which the cables entrain pulleys above the cable attach points, the platform being controlled by the cables may be raised, which will reduce the tension on the cables, allowing the cam followers to move away from the cams or to only engage them with a small amount of force. In implementations in which the cables pull directly on a platform, which may, for example, be supported by springs, the platform may be lowered. In certain implementations, the platform may be locked in a raised or lowered position (e.g., by a lever or handle) during removal. As another example, some implementations may include a bar that can be rotated onto the tops of the cam followers, which will physically move them away from the cams. The bar may be locked in place during removal of the cam assembly.

Figure 20:
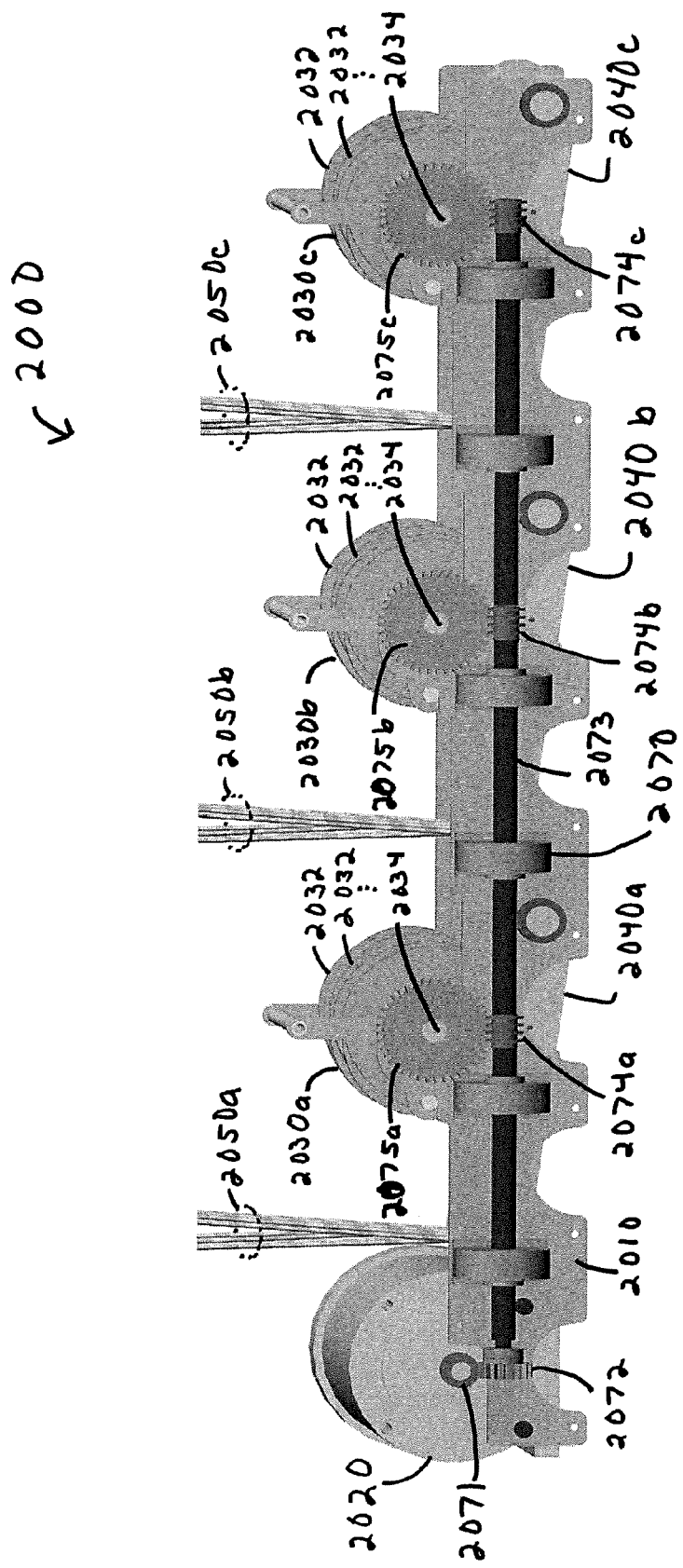
FIG. 20 is a perspective view of another example cam-controlled support system, which has multiple separate, non-inline cam assemblies.

FIG. 20 illustrates another example cam-controlled support system 2000. Among other things, system 2000 includes a base 2010, a motor 2020, a number of cam assemblies 2030, a number of sets of cam follower assemblies 2040 (only one follower arm of each set being viewable), and a multiplicity of cable groupings 2050. In general, base 2010, motor 2020, cam assemblies 2030, cam follower assemblies 2040, and cable groupings 2050 may be similar to those already discussed. For example, cam assemblies 2030 each include a number of cams 2032 that are coupled to a cam shaft 2034 (although the shape of the cams may vary from cam assembly to cam assembly to provide different motions).

Each cable grouping 2050 may be for a single unitary platform, for different parts of a segmented platform, for different parts of a single unitary platform, or for different platforms (e.g., three). The different segments of a platform may, for example, be different sections of a bed, or any other type of application where multiple objects or sections of an object need to move in a complex, repetitive, coordinated pattern. Adjacent segments of a platform may optionally be coupled by some form of joint, such as a ball-and-socket joint or a pivoting U-joint, to provide some connectivity. The number of cables required for each segment may also be adjusted, depending on what other connectivity (e.g., joints) each segment may have to other sections or the base structure. The motion pattern could be very subtle, or it could be more complex with different relative translations and rotations between segments.

System 2000 also includes a transmission 2070 for conveying power from motor 2020 to cam assemblies 2030. Transmission 2070 includes a worm 2071, a worm gear 2072, a drive shaft 2073, worms 2074, and worm gears 2075. Worms 2074 are each coupled to drive shaft 2073.

In operation, motor 2020 turns worm 2071, which meshes with worm gear 2072, turning it. Worm gear 2072 is coupled to drive shaft 2073 to turn it and, consequently, worms 2074. Worm 2074a meshes with worm gear 2075a, which is coupled to cam shaft 2034 of cam assembly 2030a, turning it. Worm 2074b meshes with worm gear 2075b, which is coupled to cam shaft 2034 of cam assembly 2030b, turning it. Worm 2074c meshes with worm gear 2075c, which is coupled to cam shaft 2034 of cam assembly 2030c, turning it. Cam shafts 2034 turn their respective sets of cams 2032 in response to power from motor 2020. By adjusting the gearing ratios between worms 2074 and worm gears 2075, the cam sets of different cam assemblies may be turned at the same or different relative speeds.

Transmission 2070 allows cam assemblies 2030, along with worm gears 2075, to be readily disengaged from system 2000 (e.g., as shown in FIGS. 18A-D). Cam assemblies 2030 may then be serviced or interchanged with another cam assembly, which may be a replacement and/or provide a different movement (e.g., due to a different shape of its cams).

Although FIG. 20 shows one way in which multiple cam assemblies (i.e., two or more) may be driven by a single motor, other configurations exist in which multiple cam assemblies may be driven by a single motor. For example, a motor may drive a single long shaft upon which each cam assembly is mounted. Additionally, each cam assembly 2030 may be driven by its own motor.

Figure 21:
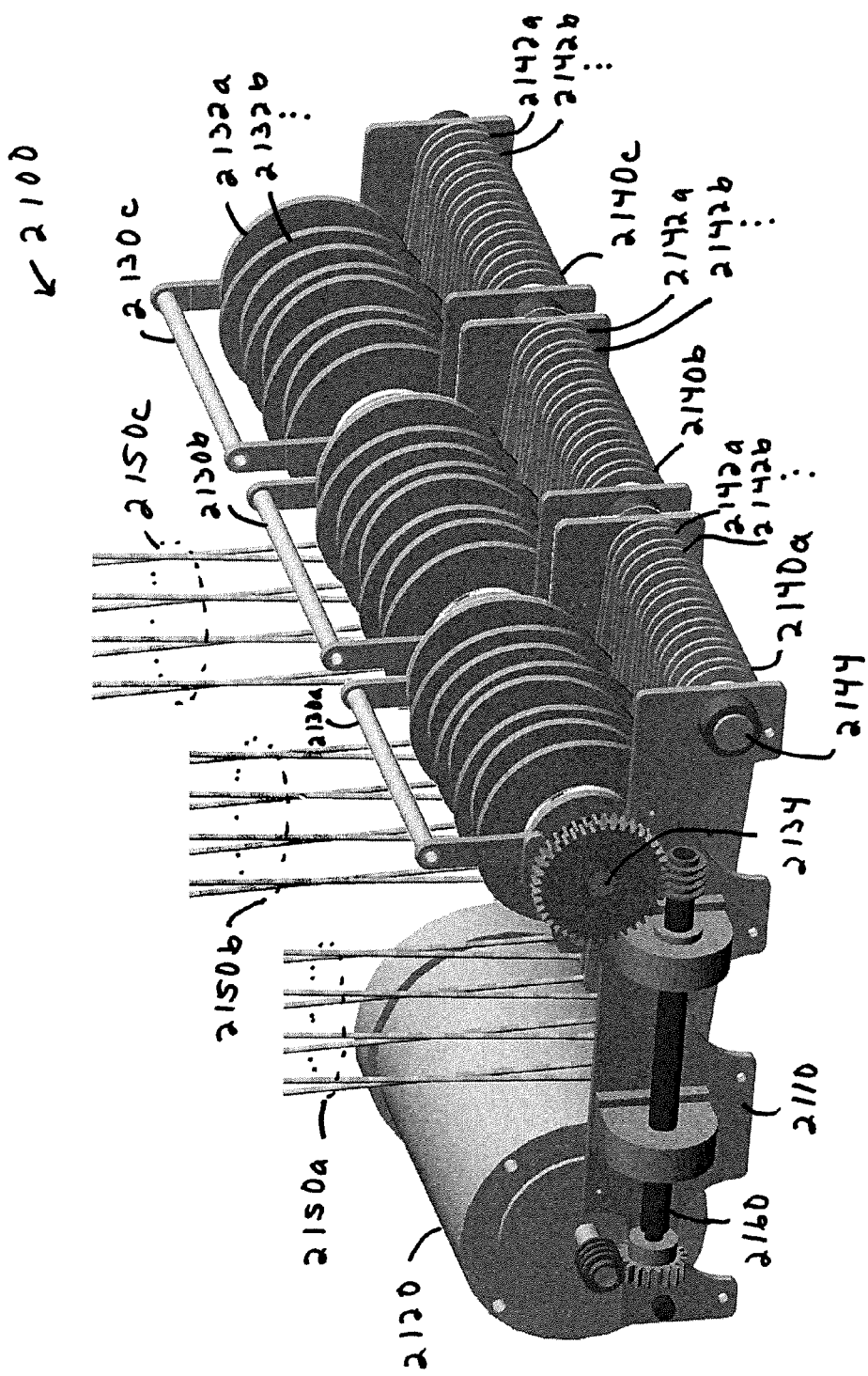
FIG. 21 is a perspective view of an additional example cam-controlled support system, which has multiple separate, inline cam assemblies.

FIG. 21 illustrates an additional example cam-controlled support system 2100. System 2100 demonstrates another way in which multiple (i.e., two or more) cam sets can be driven by a single motor.

Among other things, system 2100 includes a base 2110, a motor 2120, a number of cam assemblies 2130, a number of sets of cam follower assemblies 2140, a multiplicity of cable groupings 2150, which couple to one or more platform supports (not shown), and a transmission 2160. Base 2110, motor 2120, cam assemblies 2130, cam follower assembly sets 2140, cable groupings 2150, and transmission 2160 may be similar to those already discussed. For example, cam assemblies 2130 each include a number of cams 2132, which interact with cam followers 2142 in associated cam follower assemblies 2140. In this implementation, however, cam shaft 2134 is a single long shaft that runs between cam assemblies 2130. Cam shaft 2134 may be a unitary composition or may be segmented (e.g., between cam assemblies 2130) with couplers in between.

Each cable grouping 2150 may be for a single unitary platform, for different parts of a segmented platform, for different parts of a single unitary platform, or for different platforms (e.g., three). The different segments of a platform may, for example, be different sections of a bed, or any other type of application where multiple objects or sections of an object need to move in a complex, repetitive, coordinated pattern.

In operation, motor 2120 drives cam shaft 2134 upon which each cam assembly 2130 is directly mounted. Motor 2120 is coupled to cam shaft 2134 by transmission 2160, which is a worm drive in this implementation. Transmission 2160 may be any other appropriate type of transmission in other implementations (e.g., chain and sprocket). Each cam 2132 then drives its associated cam follower assembly 2142, the right ends of which can be seen in this view. Each set of cam follower assemblies 2140 pivots on an axis 2144, which could be individual for each cam set of follower assemblies 2140 or shared between them, and engages a cable grouping 2150, each grouping driving one or more platform supports (directly and/or through their own set of pulleys).

FIGS. 22A-B illustrate an example platform 2200 for a cam-controlled support system. Platform 2200, which may, for example, be a bed, includes three segments 2210. Each segment 2210 includes a number of platform supports 2220. The platform supports are coupled to cables 2230 to drive the platforms. In certain implementations, the cables driving each platform support 2220 may be coupled to a different cam assembly. In other implementations, the platform supports for each segment 2210 may be coupled to different cam assemblies. Other correlations between platform supports and cam assemblies are possible. The cam assemblies may be driven by a common motor or different motors.

In this implementation, platform supports 2220 include flexible members 2222 at the cable attach points. Flexible members 2222, illustrated here as horizontal plates, flex in the vertical direction during loading (e.g., static or dynamic). Flexible members 2222 may provide a shock absorbing feature to segments 2210 and assist in distributing tension between the cables. Flexible members 2222 may be similar to those discussed previously.

FIG. 22B illustrates how a three-section platform could be driven in motion by cables 2230, similar to the earlier discussed implementations. In this view, the motor, transmission, cam assemblies, cam follower assemblies, etc. are not shown, but could be located beneath the bed sections or anywhere of convenience. Any of a variety of motor, transmission, and cam assemblies discussed previously could be used. The cables, oriented and directed by pulleys (not shown), can ultimately attach onto the platform supports 2220 to drive the bed sections. Any number of sections could be configured in a manner similar to this. Each cam assembly (whether driven by a single motor or individual motors) could, for example, drive each segment 2210 differently.

The adjacent platform segments 2210 may optionally be connected by some form of joint 2240, such as a ball-and-socket joint or a pivoting U-joint, to provide some connectivity. The number of cables required for each section may also be adjusted, depending on what other connectivity (e.g., joints) each section may have to other sections or the base structure. For example, if a platform section is connected to another section or the ground by a ball-and-socket joint, then perhaps only three cables would be needed to prescribe motion of its other three degrees of freedom.

The motion pattern for platform 2200 could be very subtle, or it could me more complex with different relative translations and rotations between sections. The different segments of a platform may, for example, be different sections of a bed, or any other type of application where multiple objects or sections of an object need to move in a complex, repetitive, coordinated pattern.

Although the invention has been described with reference to specific embodiments, this description is not meant to be construed in a limiting sense. For example, the specifications state that the motor and other elements attached to the base, but this need not be so. The platform may be affixed to the ground or other support surface with the base moveable above the fixed platform. The base and platform are terms to describe that one part is moving with respect to the other. Moreover, while springs are set forth in these specifications, they are meant to be any elastic component, such as, for example, an elastomeric member, pneumatic/hydraulic piston, etc. Moreover, the term "saddle" describes a surface appropriate for engaging a rider. Various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. An apparatus for generating multi-dimensional motion, the apparatus comprising:
    a base adapted to rest on a support surface;
    a platform moveable relative to the base and adapted to receive a platform load;
    a motor;
    a cam assembly having multiple cams on a cam shaft, the cam shaft driven by the motor to rotate the cams;
    a multiplicity of cam follower assemblies, the cam follower assemblies in pivoting engagement to the base and responsive to the movement of the cams; and a multiplicity of cables, each cable engaging a cam follower assembly and the platform, such that rotation of the cam shaft by the motor causes the platform to move responsive thereto.

2. The apparatus of claim 1, further comprising a structural support system including plurality of structural members and pulleys to support the platform in spaced apart, movable relation to the base.

3. The apparatus of claim 2, wherein the structural support system comprises a multiplicity pulleys coupled to the base, at least some of the pulleys entraining at least some of the cables at points above where such cables attach to the platform.

4. The apparatus of claim 3, wherein the cable attach points are flex during loading.

5. The apparatus of claim 4, wherein the cable attach points comprise horizontal plates that flex vertically during loading.

6. The apparatus of claim 3, wherein the multiplicity of cables is eight, and wherein the platform includes a multiplicity of downwardly depending legs with eight attachment points for the eight cables, wherein the multiplicity of base mounted pulleys is eight arranged at four areas or points on the base.

7. The apparatus of claim 3, wherein at least some of the pulleys are flexibly mounted to the base.

8. The apparatus of claim 3, further including plate members for maintaining the multiplicity of cams positionally with respect to one another on the camshaft, and wherein the base is adapted to receive the members such that the cams are adjacent the cam follower assemblies and the camshaft engages directly or indirectly the motor.

9. The apparatus of claim 2, wherein the structural members comprise a multiplicity of compression springs mounted between the platform and the base, wherein the platform is moveably positioned by the springs above the base, and wherein at least some of the multiplicity of cables are configured to pull the platform against the compression springs.

10. The apparatus of claim 2, wherein the structural members include a non-cable mechanical coupling between the platform and the base and at least one base mounted pulley adapted to entrain the cable at a point above the point where the cable attaches to the platform.

11. The apparatus of claim 10, wherein the non-cable mechanical coupling comprises a sliding joint.

12. The apparatus of claim 10, wherein the non-cable mechanical cable comprises a hinge.

13. The apparatus of claim 10, wherein the non-cable mechanical comprises is a strut having at least one ball joint.

14. The apparatus of claim 10, wherein the non-cable mechanical cable comprises a strut having a pair of ball joints at the removed ends thereof.

15. The apparatus of claim 10, further including springs for engagement between the base and the platform.

16. The apparatus of claim 1, wherein the platform cable attachments points, base, and platform are configured to generate platform motion in six degrees of freedom.

17. The apparatus of claim 1, further including a saddle shaped member for engagement with the platform.

18. The apparatus of claim 17, further including a saddle horn and stirrups.

19. The apparatus of claim 1, further including plate members for maintaining the multiplicity of cams positionally with respect to one another on the camshaft, and wherein the base is adapted to receive the members such that the cams are adjacent the cam follower assemblies and the camshaft engages directly or indirectly the motor.

20. The apparatus of claim 1, wherein the cam follower assemblies are arranged on a common, base mounted axle.

21. The apparatus of claim 1, wherein the motor is an electric motor with a speed controller.

22. The apparatus of claim 1, wherein the base and the cam assembly are adapted so that the cam assembly is removable from the base.

23. The apparatus of claim 22, wherein the base comprises sockets, and the cam assembly comprises bearings sized to be received in the sockets.

24. The apparatus of claim 23, wherein the cam assembly comprises arms to lock the cam assembly to the sockets.

25. The apparatus of claim 1, further comprising a second cam assembly engagable with the base and the motor.

26. The apparatus of claim 1, further comprising a transmission for conveying power from the motor to the cam assembly.

27. The apparatus of claim 26, wherein the transmission comprises a worm drive.

28. The apparatus of claim 27, wherein the cam assembly is adapted to be detachable from the worm drive and the base.

29. The apparatus of claim 1, further comprising:
a second cam assembly having multiple cams on a cam shaft;
a second multiplicity of cam follower assemblies, the second cam follower assemblies in pivoting engagement to the base and responsive to the movement of the cams in the second cam assembly; and
a second multiplicity of cables, each cable engaging a second cam follower assembly and the platform, such that rotation of the second cam shaft causes the platform to move responsive thereto.

30. The apparatus of claim 29, wherein the motor also drives the cams in the second cam assembly.

31. The apparatus of claim 29, further comprising a transmission adapted to drive the second cam assembly at a different rate than the first cam assembly.

32. The apparatus of claim 1, wherein the platform comprises at least two segments.

33. The apparatus of claim 32, wherein the platform is a bed.

34. The apparatus of claim 32, wherein the platform comprises moveable joints between the segments.

35. The apparatus of claim 32, wherein some of the multiplicity of cables drive a first segment of the platform and some of the multiplicity of cables drive a second segment of the platform.

36. The apparatus of claim 32, wherein the multiplicity of cables drives a first segment of the platform and further comprising:
a second cam assembly having multiple cams on a cam shaft;
a second multiplicity of cam follower assemblies, the second cam follower assemblies in pivoting engagement to the base and responsive to the movement of the cams in the second cam assembly; and
a second multiplicity of cables, each cable engaging a second cam follower assembly and a second segment of the platform, such that rotation of the second cam shaft causes the second segment of platform to move responsive thereto.

37. The apparatus of claim 36, wherein the motor drives the first cam assembly and the second cam assembly.

* * * * *